United States Patent [19]

Barnes et al.

[11] Patent Number: 5,970,475

[45] Date of Patent: Oct. 19, 1999

[54] ELECTRONIC PROCUREMENT SYSTEM AND METHOD FOR TRADING PARTNERS

[75] Inventors: Robert L. Barnes, Summit; Andrew J. Berti, Jersey City, both of N.J.; Kevin Doyle, Tring Hertforshire, United Kingdom; Peter J. Rawlinson, Jersey City, N.J.

[73] Assignee: Intelisys Electronic Commerce, LLC, New York, N.Y.

[21] Appl. No.: 08/949,182

[22] Filed: Oct. 10, 1997

[51] Int. Cl.[6] .................................................. G06F 17/60
[52] U.S. Cl. ................. 705/27; 340/825.3; 340/825.31; 340/825.34; 705/1; 705/26
[58] Field of Search ........................... 340/825.3, 825.31, 340/825.34; 705/1, 8, 26, 27

[56] References Cited

U.S. PATENT DOCUMENTS

| | | | |
|---|---|---|---|
| 4,774,663 | 9/1988 | Musmanno et al. | 364/408 |
| 4,796,292 | 1/1989 | Thomas | 379/91 |
| 4,799,156 | 1/1989 | Shavit et al. | 364/401 |
| 4,812,994 | 3/1989 | Taylor et al. | 705/400 |
| 4,897,867 | 1/1990 | Foster et al. | 379/93.12 |
| 4,951,196 | 8/1990 | Jackson | 364/401 |
| 4,984,155 | 1/1991 | Geier et al. | 364/401 |
| 5,063,506 | 11/1991 | Brockwell et al. | 364/402 |
| 5,224,034 | 6/1993 | Katz et al. | 364/401 |
| 5,270,922 | 12/1993 | Higgins | 364/408 |
| 5,319,542 | 6/1994 | King, Jr. et al. | 705/27 |
| 5,355,474 | 10/1994 | Thuraisngham et al. | 395/600 |
| 5,361,199 | 11/1994 | Shoquist et al. | 364/401 |
| 5,455,406 | 10/1995 | Terashima et al. | 235/379 |
| 5,465,206 | 11/1995 | Hilt et al. | 364/406 |
| 5,475,585 | 12/1995 | Bush | 364/401 |
| 5,504,893 | 4/1996 | Kawashima et al. | 395/600 |
| 5,515,268 | 5/1996 | Yoda | 364/401 |
| 5,528,490 | 6/1996 | Hill | 364/403 |
| 5,544,040 | 8/1996 | Gerbaulet | 705/26 |
| 5,557,518 | 9/1996 | Rosen | 364/408 |
| 5,592,375 | 1/1997 | Salmon et al. | 705/7 |
| 5,592,378 | 1/1997 | Cameron et al. | 705/27 |
| 5,623,660 | 4/1997 | Josephson | 395/609 |
| 5,666,493 | 9/1997 | Wojcik et al. | 705/26 |
| 5,694,551 | 12/1997 | Doyle et al. | 705/26 |
| 5,721,832 | 2/1998 | Westrope et al. | 705/27 |
| 5,758,329 | 5/1998 | Wojcik et al. | 705/28 |
| 5,799,289 | 8/1998 | Fukushima et al. | 705/400 |
| 5,808,894 | 9/1998 | Wiens et al. | 364/479.01 |

*Primary Examiner*—Edward R. Cosimano
*Attorney, Agent, or Firm*—Lackenbach Siegel Marzullo Aronson & Greenspan, P.C.

[57] ABSTRACT

An Electronic Commerce system enables corporate purchasers and suppliers to electronically transact for the purchase and supply of goods/services. The system includes three major hardware and software components: buyer, supplier and bank/administration. To enable suppliers to supply goods and services online and process electronic orders, several software components are used for operating a supplier processor server and a supplier catalog server. To enable corporate purchasers to purchase products and services online, preferably over the Internet, from suppliers, software is used for operating a customer server to which multiple users may log-on and access the supplier server. An Automated Clearing House (ACH) server may be used to interface with a bank's (ACH) systems. A service bureau that supplies the hardware and/or software components and assists to administer the system includes a transaction counter, which records transactions and charges the buyers and/or suppliers based on the number of purchase orders and/or invoices issued.

Although the present invention has been described in relation to particular embodiments thereof, many other variations, modifications and other uses will become apparent in those skilled in the art. It is preferred that the present intention be limited not by the specific disclosure herein, but by the scope of the appended claims.

25 Claims, 26 Drawing Sheets

Payment Module procedure — 141

CUSTOMER Server

- Based on the rule set-up in the suppliers profile (ASN or Invoice) the transaction is added to the payment log of the supplier (unless has open query for that order)
- Based on the payment scheduler the server auto generates the payment to be made or user can generate it manually
- Option modify generated payment before sending
- Signing Personnel notified via email
- When required no. of signatories signed it sends encrypted payment instruction to Gateway
- Alarm sent to designated user if time to sign is exceeded
- Receives confirmation from Gateway
- POST TO LEGACY SYSTEM

User

- User receives email
- User logs on to system
- After the server Authenticates the user the Intelipro Home Page is presented.
- User selects the relevant task or applet option
- The user can veiw all transaction being paid and make adjustments if required
- After editing User types in their password.

ACH Gateway — 50

Legacy System — 46

FIG. 23

ELECTRONIC PROCUREMENT SYSTEM AND METHOD FOR TRADING PARTNERS

BACKGROUND OF THE INVENTION

1. Field of the Invention

The present invention generally relates to electronic commerce systems and, more specifically, to a procurement system and method for trading partners which enables a plurality of users within a purchasing organization to procure goods/services from pre-arranged suppliers, consistent with the level of authorization given to each user and enables automated payments to the supplier by a bank after the goods/services have been delivered.

2. Description of the Prior Art

In any business, and particularly within large organizations having hundreds or even thousands of employees, the procurement of "non-production" or "non-custom" products and services in high volume is generally a time consuming process and a costly one. In various industry surveys, companies cite the costs of processing a requisition and a purchase order as anywhere between $25 and $300; a cost that often exceeds the value of the goods being ordered.

Ordering of non-production goods in high volumes, such as office supplies and desktop hardware, can be a time-consuming and expensive process for suppliers as well. For example, suppliers have to be increasingly competitive in today's market as their customers are constantly seeking immediate turn-around on orders and better overall customer service. However, suppliers find that the process of phone or paper purchase orders is costly because of the administration associated with order processing, can cause delays in order fulfillment, and is prone to errors. Additionally, paper-based marketing in the form of catalogs and price lists is expensive and makes it difficult to keep customers up-to-date with the latest product availability and pricing.

Ultimately, all these factors impact buyers through higher prices or poor service. Buyers have to implement time-consuming processes to prevent purchases that exceed employee limits. As a result, the cost of processing requisitions and purchase orders often exceeds the value of the goods being purchased. Buying organizations also find it difficult to prevent employees from purchasing from non-preferred suppliers and thus do not get the advantage of negotiated prices. This adds to buyers' costs and reduces business for their preferred suppliers.

There is, therefore, an extremely large overhead factor associated with the procurement of products and services which, in a large organization, can cost the company thousands or even millions of dollars a year.

There is a need, therefore, for a simple automated procurement system that will reduce the amount of paper needed to be handled and enable the employees within an organization to acquire the goods and services that they require, consistent with their needs to perform their tasks. An automated system must be secure so that it is not abused by employees within the organization or parties outside of the organization.

There have been a number of obstacles in establishing an effective commerce system. Systems disclosed in previously issued patents have sought to address some of these obstacles. One problem is the "user-friendliness" of the systems, or the ease of use of the systems so that each person that needs to requisition a product or service can do so in an easy and efficient way. Another problem has been to develop a system that can be used with existing computer systems. This is an important consideration since many businesses have already made substantial investments in "legacy" systems, including main frames, mini computers, and micro computers. These systems frequently use different operating systems and different data formats. Another problem has been to develop user interface that is secure from abuse from within and from outside the buyer organization.

One example of an on-line system for processing business transactions is disclosed in U.S. Pat. No. 4,799,156 for an Interactive Market Management System. The system discloses a plurality of buyers and a plurality of sellers which can be linked to each other by means of an interactive market management system (IMMS) for interactive communications. Each of the participating entities which is a subscriber to the system must always operate through the IMMS, which serves as a focal point or hub through which all transactions must be funneled. The patent does not address the need or ability of individuals within an organization to be provided with different levels of authorization so that different users within the same organization or "buyer" can access different types and/or spend different amounts on goods and/or services.

In U.S. Pat. No. 5,557,518, a system is described for trusted agents for open electronic commerce. However, this patent involves the use of "money modules" to create a secure transaction environment for both the buyer and the seller of electronic merchandise and services. The primary objective of the patent is to provide a system which allows customers to buy electronic merchandise or services on demand without enrolling in an electronic community. According to this patent, a customer and supplier, trusted agent, establish a secure session. The customer trusted agent communicates with a first money-module and the supplier trusted agent communicates with the second money-module. The supplier trusted agent delivers the electronic merchandise. The first money module transmits electronic money to the second money module. Upon successful completion of the money payment, the first money module informs the customer trusted agent, and the second money module informs the supplier trusted agent. The supplier then logs the sale and the customer may use the purchased electronic merchandise. The patent appears to be restricted to the sale of electronic merchandise.

In U.S. Pat. No. 5,319,542, a system for ordering items using an electronic catalog is disclosed. However, the disclosure is primarily concerned with establishing a private catalog resident on a customer's computer system. The customer can electronically requisition a product based on the information provided in the catalog and route or requisition through the appropriate approval process within the enterprise. However, requisitions must then be processed through the customer's procurement system and transmitted electronically as purchased orders to the supplier. Therefore, aside from establishing private catalogs which may be used by the customer, the system disclosed in the patent does not eliminate many of the inefficiencies and expenses involved with requisitioning products and/or services by many employees in a large organization.

In U.S. Pat. No. 5,592,378, a computerized order entry system and method is disclosed which includes a plurality of servers, data entry devices, back-end systems and data bases. The computer order entry system is intended to permit placement of orders by capturing order information and storing the order information through the data capture mechanism. This is accomplished by a sequence of steps of multiple search categories. The patent does not address the ready accessibility and ease of use by many employees within an organization to requisition goods/services from a pre-arranged trading partner or multiple partners.

SUMMARY OF THE INVENTION

It is an object of the present invention to provide an electronic procurement system for and method of initiating and consummating sales transactions of goods and/or services by buyers and suppliers (as pre-established trading partners).

It is another object of the present invention to provide an electronic procurement system as aforementioned which is easy to implement and to use.

It is still another object of the present invention to provide an electronic procurement system and method, as suggested in the previous objects, which is particularly suitable with buying organizations having a large number of employees each of which has well-defined authorizations for the purchase of goods/services in order to control such purchases and prevent abuses from within the organization.

It is yet another object of the present invention to provide an electronic procurement system, as suggested in the previous objects, which enables each user within a purchasing organization to use an Intranet connection to access the organization's Intranet Server as a means for accessing the supplier's server via an Internet connection by using an Internet browser.

It is a further object of the present invention to provide a secure electronic real-time purchasing transactions between a buyer and supplier without third-party intervention.

It is still a further object of the present invention to provide an electronic procurement system, of the type under discussion, which permits any buyer and supplier organizations to establish an electronic commerce relationship with each other without regard to other establishments or enterprises, that may likewise establish electronic commerce relationships with the same or other buyer and supplier organizations.

It is yet a further object of the present invention to provide an electronic commerce procurement system which permits manual or optional automated payments by the buyer organization's bank to the supplier or supplier's bank after goods/services have been ordered and delivered to the buyer.

In order to achieve the above objects, as well as others which will become apparent hereinafter, an electronic commerce system for procuring goods/services by a plurality of users within an organization, according to the invention, comprises a plurality of terminals. A customer server is connectable to each of said terminals and includes log-on means for providing access to a user by means of one of said terminals only if the user can be properly authenticated by the customer server. A supplier system is used which includes a supplier catalog server for storing data representing a supplier catalog of goods/services that are available for purchase by an authorized user in the customer organization and a supplier processor server for processing orders received from the authorized user within the customer organization. The supplier catalog server and the supplier processor server may be combined into one server. Said supplier system is directly accessible by said customer server through an Internet connection. Security means is provided within said servers which limit transactions to entities that have pre-arranged relationships for displaying supplier catalog information to an authorized user within the customer organization for issuing a purchase order by the user to said supplier system. A bank server may be used that is accessible by said customer server through an Internet connection. Payments to the supplier by the customer organization may optionally be made through said bank server after the goods/services have been delivered to the user and an invoice has been issued to the customer organization.

Each user is preferably assigned an organization user profile which specifies a level of authorization for approval of the acquisition of goods/services from a pre-determined supplier. Said user terminals include means for displaying products/services available for acquisition from the at least one supplier and is consistent with the user's level of authorization for the acquisition of goods/services from said supplier. The supplier system includes a catalog and an order processor, said catalog containing information regarding all of the suppliers' goods made available to the customer organization, including pricing, discounts, availability, delivery information, etc., based on the organization's profile submitted to the supplier and negotiated agreement between the partners. A communication link is provided for selectively accessing, for viewing and downloading by a user, information from the supplier's catalog to the user's terminal consistent with the user's authorization level. Said customer and supplier systems are programmed to establish a cryptographically secure session for ordering and filling orders for goods, by means of said order processor from said supplier only when an authorized user seeks to acquire one or more products which the user is authorized to purchase.

BRIEF DESCRIPTION OF THE DRAWINGS

The features and advantages of the present invention will become apparent from the following description of the invention, taken together with the accompanying drawings, in which:

FIG. 16 is a flow chart representing the options/steps permitted by the customer server to a user at the buyer location after a decision has been made to access the "supplier management" module shown in FIG. 13 to specify which supplier employees can purchase from;

FIG. 23 is a flow chart representing the options/steps permitted by the customer server to a user at the buyer location after a decision has been made to access the "Payment" module from the Administration Main Menu in FIG. 13;

DESCRIPTION OF PREFERRED EMBODIMENTS

I. System Overview

The Electronic Commerce (EC) system in accordance to the present invention is an electronic purchasing/invoicing/settlements system built from a combination of off-the-shelf hardware and software packages and custom software. It is intended to reduce costs by allowing authorized end users to directly interact with suppliers, rather than through centralized purchasing agents.

Figure 1:
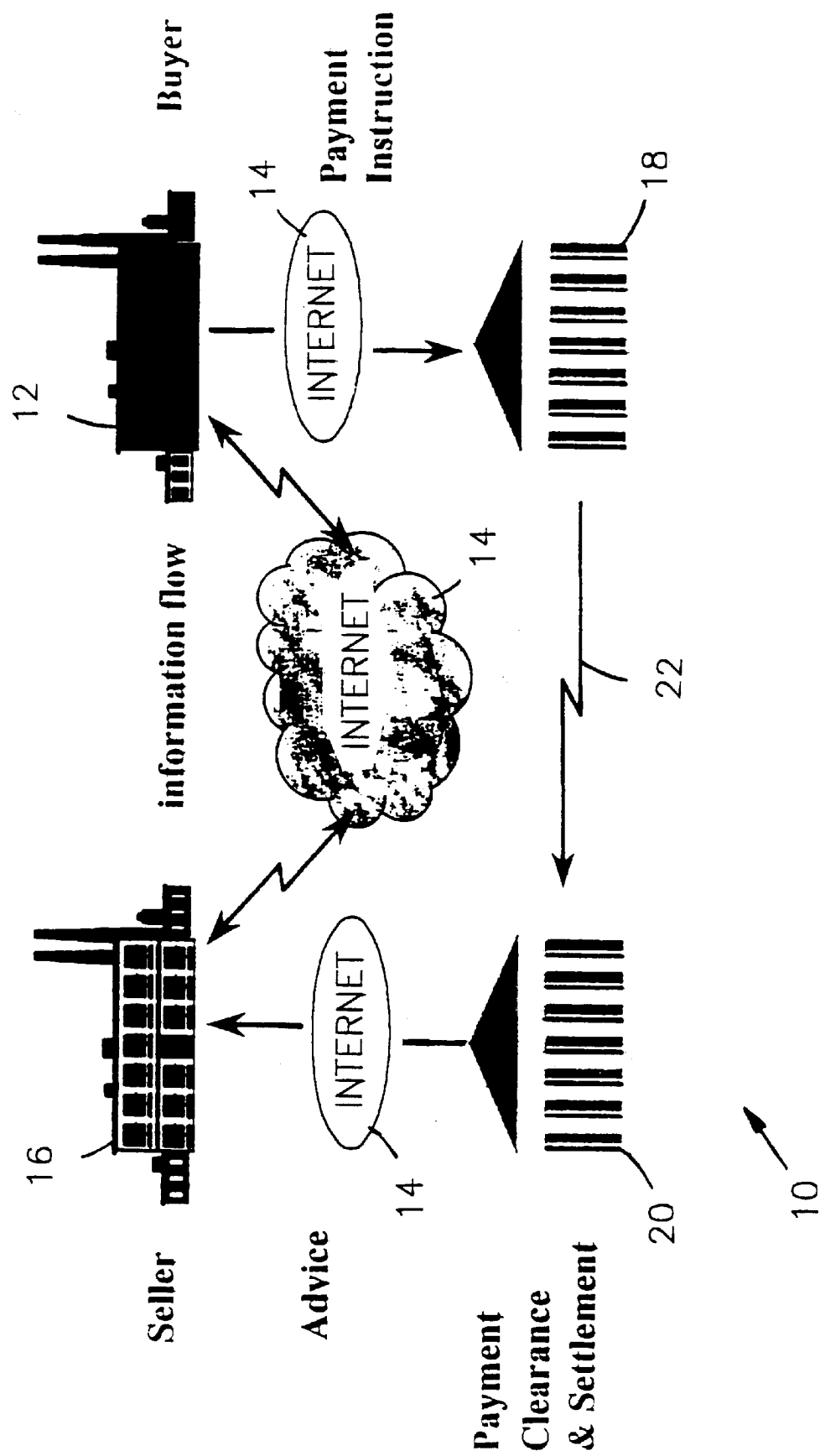
FIG. 1 is a schematic representation of the electronic commerce (EC) system in accordance with the present invention, illustrating the major participants and primary electronic transactions that flow in the use of the system.

Referring to FIG. 1, the EC System, designated by the reference numeral 10, is primarily intended to meet the purchasing requirements of a large numbers of employees/users at a buyer, purchaser or customer organization 12 who have recurrent needs to order goods and/or services. Preferably, such goods or services are standard, "non-custom" or "non-production" goods/services that might be found in and ordered from a catalog of a supplier or seller 16, such as office supplies, replacement parts and desktop computer hardware. The Internet 14 is the presently preferred medium for connectivity between the Buyer and Seller, all information flowing through the Internet, including purchase orders, sales invoices, etc. The Internet 14 is also the medium preferably used by the Buyer to send instructions to the Buyer's Bank 18 to make payments for goods/services to the Seller 16 or to the Seller's bank 20. Although normal wire transfers 22 may be made from the Buyer's Bank 18 to the Seller's Bank 20, advise or confirmation of payment may also be made through the Internet to the Seller 16.

Figure 2:
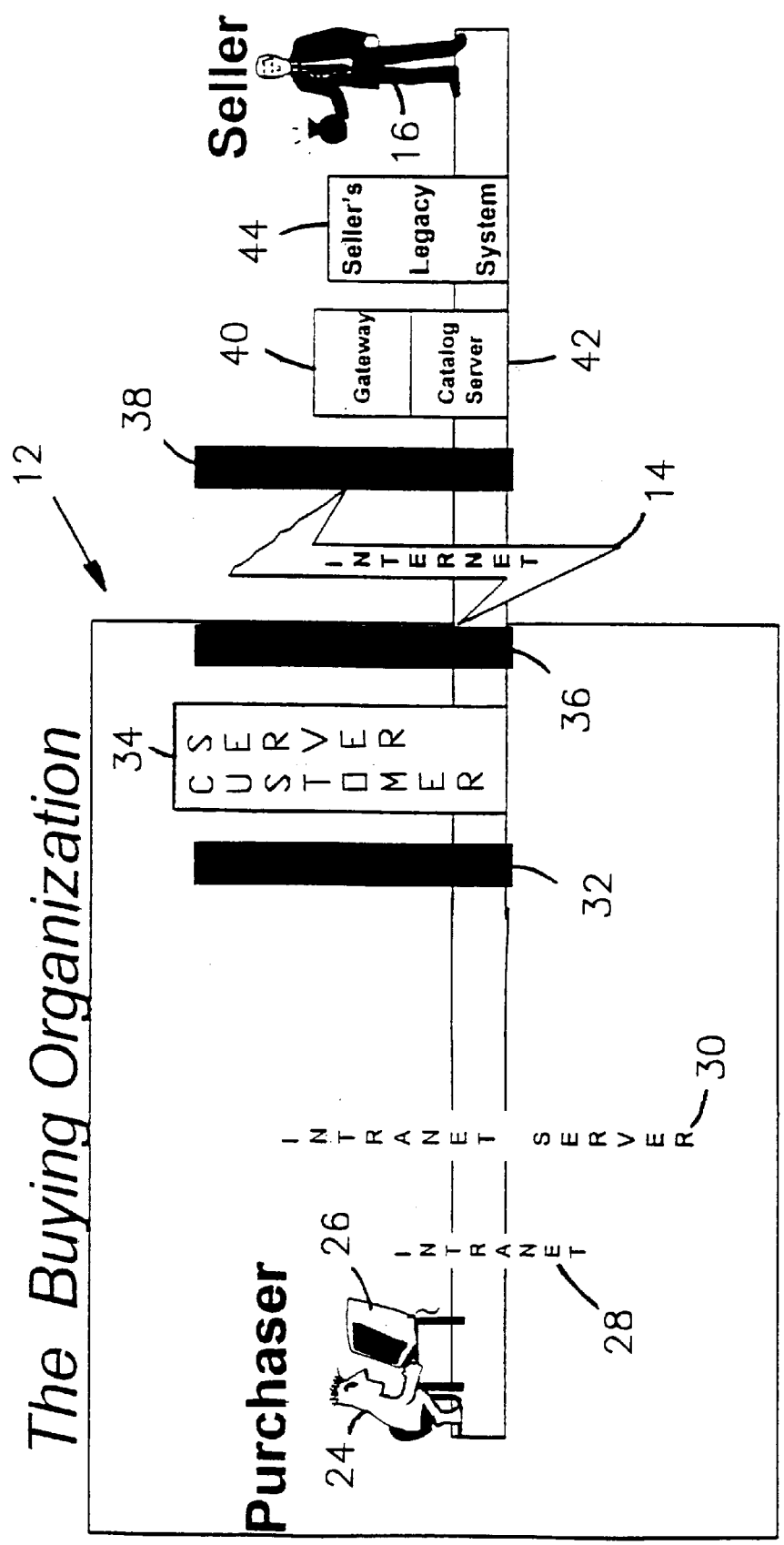
FIG. 2 is a more detailed schematic representation of the buyer and seller organizations shown in FIG. 1, and shows system connectivity between a user and a supplier during a purchasing transaction.

Referring to FIG. 2, the generalized functional and structural components linking the Buyer organization or Customer 12 and the Seller or Supplier 16 of FIG. 1 are illustrated. In the preferred embodiment, a user 24, usually an employee of the buyer organization or customer 12, uses one of a plurality of terminals 26 to access the system. After entering the user's network as a valid user by the customer's Intranet server 30. The terminals 26 may be linked to the customer server 34 in any conventional way. The user 24 can access the EC System by entering user's "application" log-on password and, being authenticated. The user is then able to enter the EC System.

Typically, once identified as a valid user by the customer server 34 requisite levels of security, in the form of firewalls 32, 36, must initially be penetrated on both sides of the customer server 34 to gain Internet access. Using a browser, such as NETSCAPE® or MICROSOFT® INTERNET EXPLORER®, the user 24 can access the seller or supplier 16 by penetrating another level of network security, in the form of a firewall 38, and being authenticated by the supplier 16.

The supplier 16 has a supplier processor server 40 and a catalog server 42. The supplier may also have a legacy system 44, in which case the supplier may also require a gateway (not shown) to the legacy system. The user 24 may access the catalog server 42, in whole or in part. The level of access is established by an administrator 58 (FIG. 5) who defines the user profile for each user in the buyer organization 12. Such profile establishes what part of the catalog server 42 the user may view, the user's spending limits, the nature of the goods/services that the user may procure, the nature of the administrative options that the user may access and execute, etc.

Figure 3:
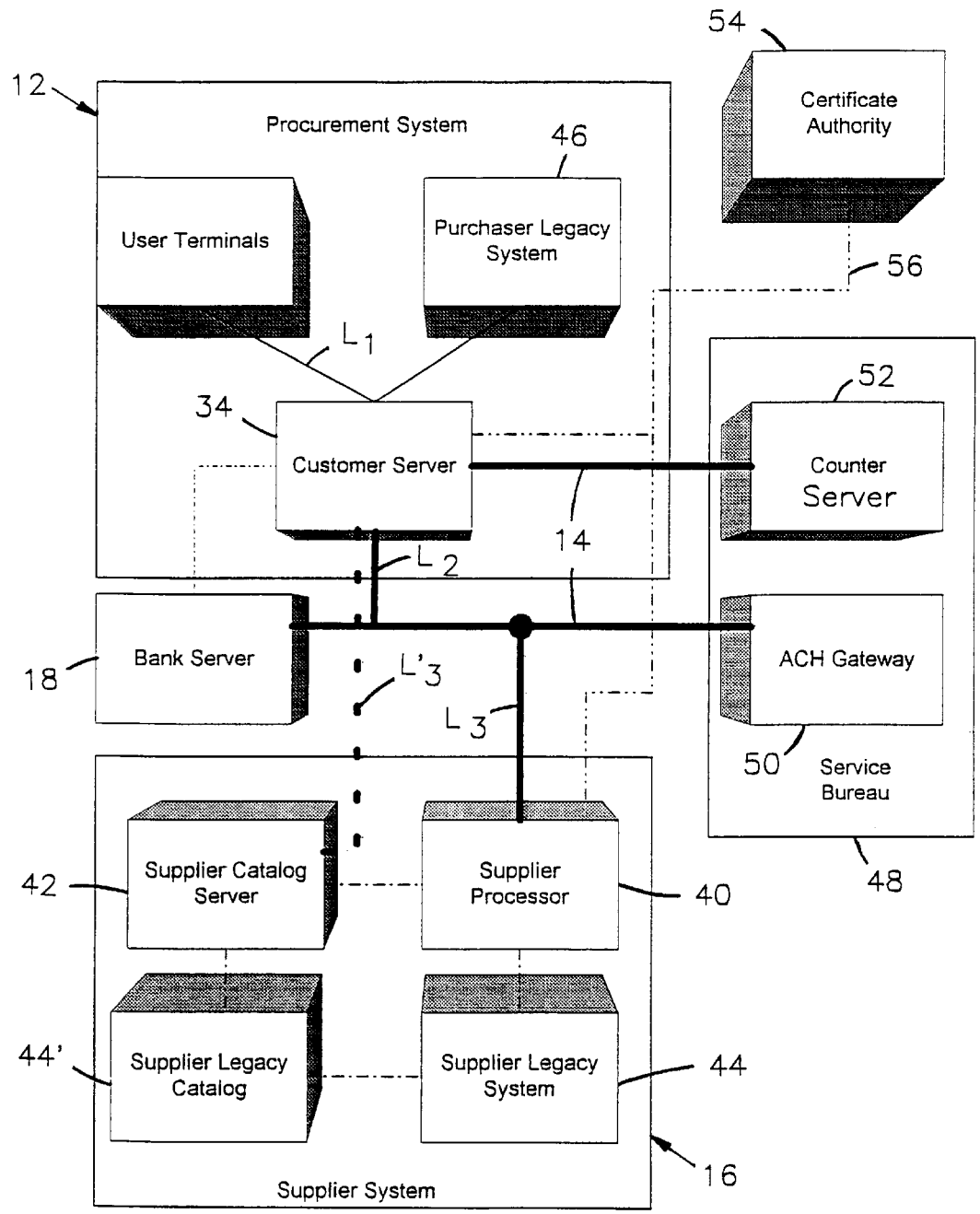
FIG. 3 is a block diagram of the EC system shown in FIG. 1, showing the major components at the buyer and seller locations, and also showing a service bureau and certificate authority used in the system.

Referring to FIG. 3, the EC System includes six main components:

a) Customer or Purchaser system 12 that includes at least one terminal 26, a Customer Server 34 (at a buyer's site running on buyer hardware). The customer system 12 may also include a purchaser legacy system 46, if the customer already has existing hardware and/or data that can be used with the customer server 34.

b) Supplier Processor Server 40 (at a vendor site running on vendor hardware). The Supplier Processor Server 40 may access Supplier's Legacy System or Servers 44, 44'.

c) Supplier Web Catalog Server 42 (running at a vendor site running on vendor hardware). The supplier legacy system 44 may include legacy catalog 44'.

d) Certificate Authority Server 54 (running off-line).

e) Bank Server 18, which may be accessed directly or by means of Automated Clearing House (ACH) Gateway 50;

f) Transaction Counter Server 52 running at a Service Bureau (SB).

The supplier catalog server 42, 44' may not be physically located near the supplier order processing system 40, 44, and these various components can be linked in any conventional way to access each other.

In addition, a Java-enabled Web browser is required, running at buyer sites on buyer-supplied PC class computers and communicating with the buyer's Customer Server 34, typically over the buyer's Intranet/LAN $L_1$. Buyer and supplier hardware running these servers use MICROSOFT WINDOWS NT SERVER 4.0® and several other MICROSOFT® products in support of the electronic commerce (EC) system.

To enable corporate purchasers to purchase goods and services online, the Electronic Commerce may be accessed using any Java-enabled browser for purchasing and purchase administration functions.

To enable suppliers to sell goods and services online by means of an electronic catalog, Electronic Commerce uses several software applications having two major supplier components:

(a) the catalog system 42, 44' that provides all catalog format, maintenance and browsing capabilities; and (b) the supply order processor system 40 that provides connectivity to legacy supply system 44 for order verification and notification.

The Counter 52 records transactions and charges buyers based on the number of purchase orders sent.

More specifically, referring to FIG. 2, the EC System is generally designated by the reference numeral 10 (FIG. 1). The Buyer or Customer System 12 includes a plurality of user terminals 26. Although only one terminal is shown, hundreds or thousands of user terminals may be used in a large company, either at one location or at a plurality of distributed or remote locations or facilities. One feature of the invention is the connection of the user terminal(s) 26 to a Customer Server 34. Preferably, the user terminal(s) 26 are connected to the Customer Server 34 by means of an Intranet link $L_1$. The Customer Server 34 may be connected to a Purchaser Legacy Data Base 46.

Referring to FIG. 3, the Customer Server 34 is connectable to the Supplier Order Processor 40 by means of the Internet (Links $L_2$, $L_3$) and the Supplier Catalog Server 42 by means of Internet Link $L_3'$ when the components 40, 42 are nor linked to each other but must be separately accessed. The Supplier System 16 includes a Supplier Order Processor 40 connected to the Supply Legacy System 44, which represents a supplier's original hardware and/or data base or archival records. The Supplier Catalog Server 42 may be connectable to a Legacy Catalog 44' which represents a supplier's original electronic catalog.

The Customer Server 46 is optionally connectable to the Bank Server 18, directly or by means of an ACH Gateway 50. The method chosen to access the Bank Server will be determined by the format of the data that will be accepted by the Bank. Where the Bank can accept instructions directly from the customer server 34, the ACH Gateway 50 may be omitted. When used, the ACH Gateway 50 may be located at a service bureau (SB) 48, where the counter 52 may also be located.

Figure 4:
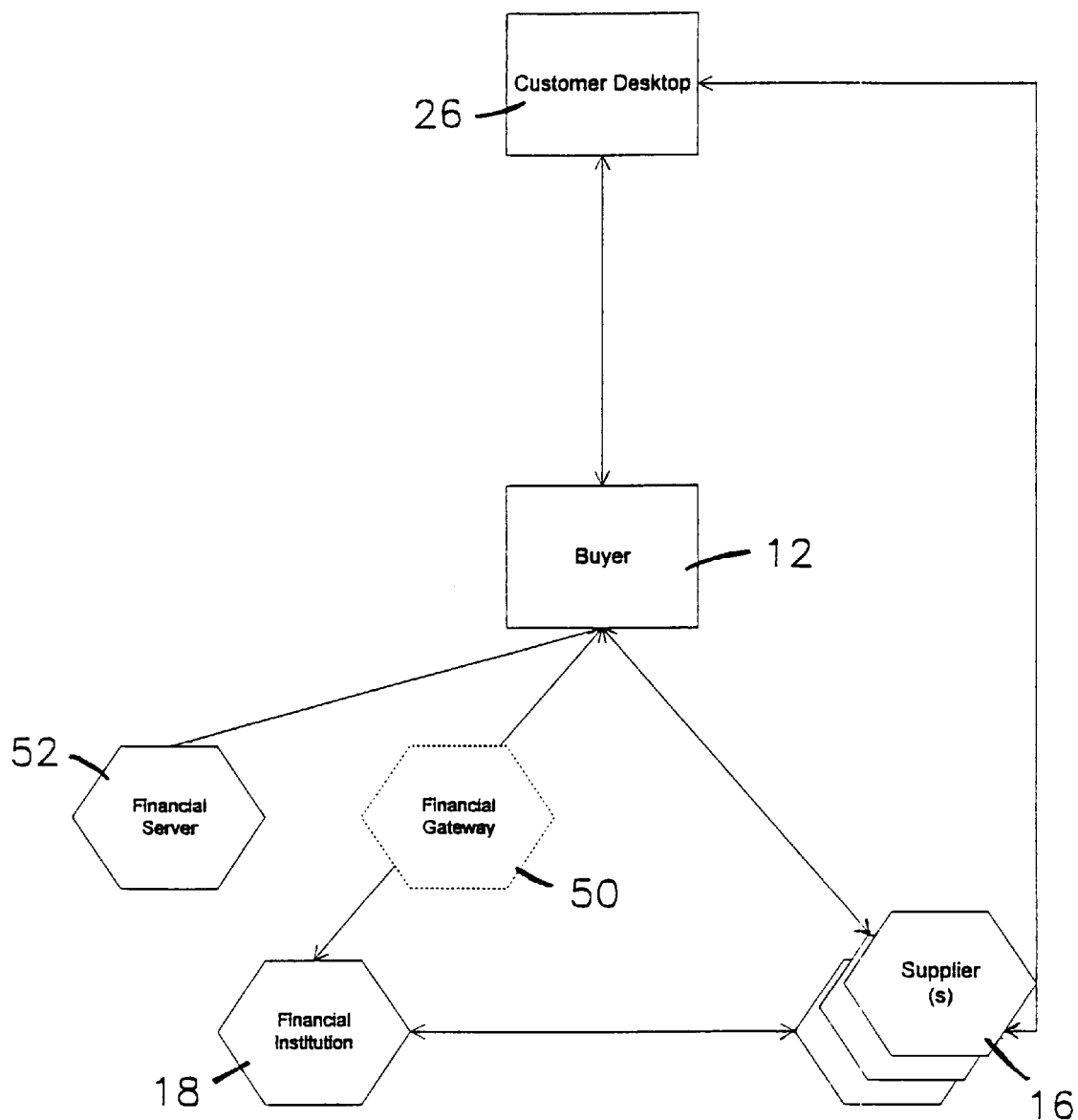
FIG. 4 is a flow diagram illustrating the connectivities between the primary blocks shown in FIG. 3.

FIG. 4 illustrates the general connectivities between the primary blocks shown in FIG. 3, and highlights the direct connectivity between the buyer 12 and the supplier(s) 16, without any intermediary agents. Similarly, there is direct connectivity between the buyer 12 and the bank 18, except when the bank requires translation of data to a format consistent with it's own server, in which case the ACH Gateway 50 must be used. The counter 52 at the service bureau only monitors and counts transactions based on purchase orders sent by the customer server 12 to the supplier(s). This allows the service bureau to be compensated on a per transaction basis. However, clearly, other payment arrangements can be made to compensate the service bureau, such as flat annual or periodic payments, in which case the counter 52 may be omitted in some instances.

Figure 5:
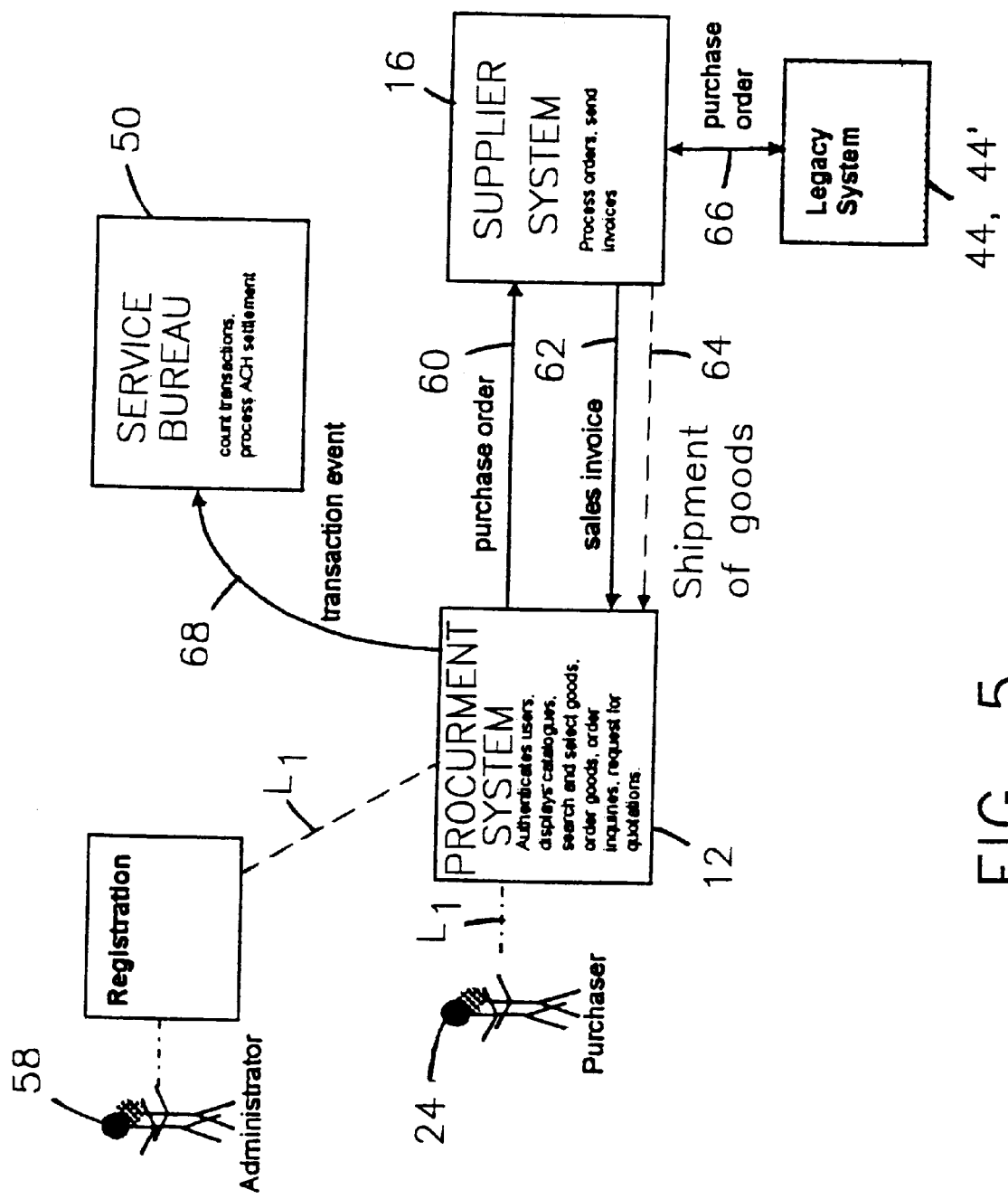
FIG. 5 is a block diagram illustrating administrator and user control at the buyer or procurement system; and also showing the transactions conducted by the primary system participants during a purchasing transaction.

Referring to FIG. 5, an Administrator 58, can set up the parameters of the user hierarchy within the procurement system 12 to establish which users 24 can access which portions the Supplier's Catalog 42, 44' and other administrative functions. In this way, each user 24 must be authenticated for level of access, for requisition and/or administration. The bank server 18 is registered directly with the customer using FIMAS authentication.

The Procurement System 12 serves to authorize users 24 to display catalogs, search and select goods, order inquiries and request quotations. The Supplier System 16 processes orders, queries, and sends invoices. The Bank Server 18 processes ACH settlements and the Counter 52 counts transactions. Aside from registering the Procurement System 12, as aforementioned, the Administrator 58 also establishes the authorization level for each user 24 when using one of the terminals 26 to define what portion of the Supplier catalog 40, 42 each user can access, the nature of the goods that the user can order and/or the spending limit that each user has for purchasing the designated goods/services.

FIG. 5 illustrates the basic transactions that the EC System 10 can execute. The Procurement System 12 sends purchase orders 64 to the Supplier System 16, while the Supplier System 16 issues sales invoices 62 to the Procurement System 12. The goods/services ordered by the user 12 are supplied, at 64 to the user. The purchase order information is stored, or may be retrieved, at 66 from the Supplier's Legacy System 44, 44'. After a shipment has been made to the user, the user can select how to pay the invoice, e.g., by creditor purchase card, check, Legacy System, or ACH. If ACH is selected, a transaction event 68 is transmitted to the bank's transaction processor 50 to input into the Bank Server 18 the nature of the transaction and/or the payment(s) that need to be made to the Supplier. The Counter 52 counts the number of transactions so that the service bureau 48 can be compensated for it's payment, clearance and settlement services. General system requirements are global components that provide common functionality. For example, all functional components have potential requirements for error handling; but for the sake of uniformity and efficiency, these requirements are moved from their respective functional components into the common error handling functional component category.

Other general system requirements include:
1. Security—for encryption, decryption and authentication,
2. Reporting—for providing management and information reports;
3. Monitoring, logging and audit trails;
4. Legacy Integration—for integration with existing systems and processing;
5. Messages and communications—for communication requirements.

II. System Architecture

Figure 6A:
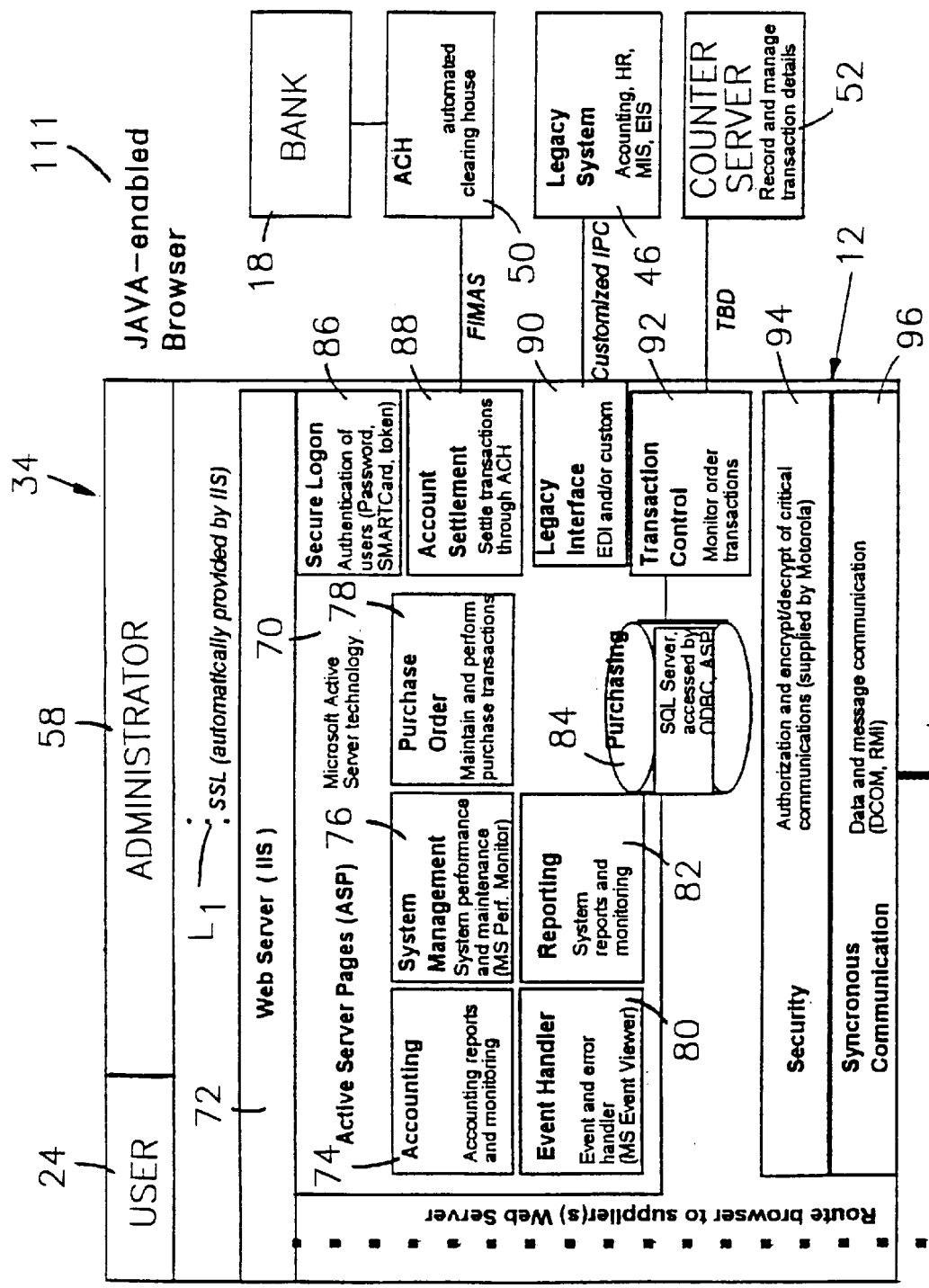
FIG. 6 is a detailed block diagram of the EC system, illustrating the major software modules residing in the hardware located at the buyer and supplier locations.
Figure 6B:
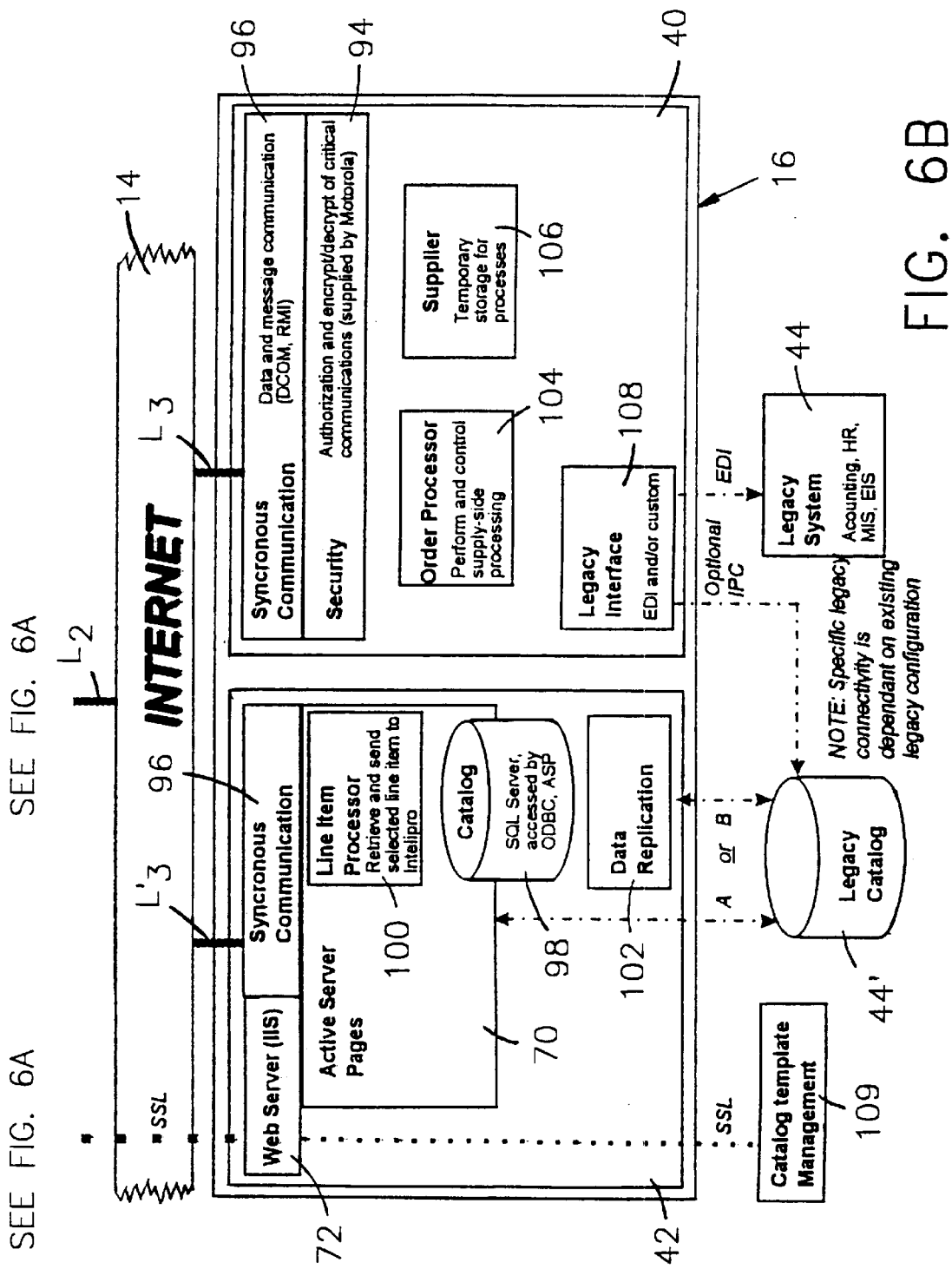

Referring to FIG. 6, the Electronic Commerce system 10 is preferably an open system capable of integration with any potential legacy system. The nature of the Electronic Commerce system requires a methodology that is resilient enough to adapt to requirements that are not yet known or well understood. It also must feature a lexicon that is concise enough to provide a unified vision for development, but loose enough to handle unknown variables such as legacy system integration.

Once the Procurement System 12 has been installed and set up, users 24 can purchase goods from supplier catalogs 42, 44' on the Internet 14 via links $L_2$, $L_3$, $L_3'$ or through supplier catalogs hosted on their corporate Intranet via link L.

Users 24 can have access to different areas of functionality within the Procurement System 12, depending on the tasks they need to carry out for their jobs. The main areas of functionality, established within the Customer Server 46 are:
1. Purchasing—completing requisition requests which are sent as purchase order to suppliers 13.
2. System Management—setting up options on how the system operates, for example archiving options.
3. Accounting Management—setting up accounting information, for example sales tax rates for delivery locations.
4. Purchasing Management—setting up suppliers that the company wants to purchase from and specifying the goods employees can purchase and the suppliers they can purchase them from. Also setting up global Requisition Request templates for employees to use.
5. Employee Management—setting up employees as users and setting up their details, for example which areas of functionality they can access.
6. Reporting—all users can view status and history of orders and generate reports.

Software is provided for the suppliers to enable them to set up an online catalog, specify customer-specific pricing profiles and to process purchase orders received from corporate purchasers.

The Supplier System 16 has two major components. The supplier catalog server 42 that provides all catalog format, maintenance and browsing capabilities. The Supplier Order Processor Server 40 provides connectivity to legacy supply systems 44 for order verification and notification.

The ACH Gateway 50 enables the supplier system 16 to interface with a bank's Automated Clearing House (ACH) systems, when used. The ACH Gateway 50 may be located at the service bureau 48. The counter 52 records transactions and charges buyer's "transaction fees" based on purchase orders.

The EC system includes a Web server 72 for linking the terminals 26 to the customer server 34 by Intranet link $L_1$.

A secure socket layer (SSL) is provided by the Internet information server (IIS), provided by the MICROSOFT® Corporation.

The customer server 34 is advantageously provided with a number of software modules, including "Accounting" 74 for monitoring accounts and generating reports; "System Management" 76 for setting up the system and maintaining its performance; "Purchase Order" 78 for maintaining and performing purchase transactions; "Event Handler" 80 for handling events and errors; "Reporting" 82 for generating system reports. MICROSOFT® SQL purchasing data base server 84 is used which can be accessed by ODBC or ASP. A "Secure Log-On Module" 86 is used to authenticate users 24, by checking passwords, smartcards or tokens. Where the buyer chooses to make payments using the ACH procedure, the instructions may be sent directly to the bank 18 or through an ACH Gateway 50 by means of an account settlement module 88 to settle transactions. Where the buyer or customer has a legacy system 46, previously used for accounting, HR, MIS or EIS, the customer server 46 preferably has a "Legacy Interface" 90, using electronic data interchange (EDI) and/or custom translator. A "Transaction Control" module 92 monitors order transactions (purchase orders) by transmitting this information to the counter server 52 (FIGS. 3–5), preferably over an Internet connection, to allow the SB 48 to record and manage transaction details.

"Security Layers" 94 are used in both the buyer and supplier systems 12, 16 to provide authorization and encryption/decryption of critical communications. "Synchronous Communication" modules 96 enable data and message transfers, over the Internet 14, between the buyer and supplier systems.

The supplier catalog server 42 includes a "Catalog SQL Server" 98, similar to the purchasing catalog 84, for maintaining a catalog data base. The "Active Server Pages" 72 include a "Line Item Processor" 100 for retrieving and sending line items to the customer server 34. A Data Replication Unit 102 may be used to receive data from the legacy catalog 44'.

The supplier processor server 40 includes an "Order Processor" 104 which processes and controls the requisitions or purchase orders received from a customer user, while the "supplier" module 106 provides temporary storage for data generated during such processing. Where the supplier has a legacy system 44, a suitable "Legacy Interface" 108 is used to selectively communicate with the suppliers legacy system 44 and/or the legacy catalog 44'.

A "Catalog Template Management" unit 109 may be used to set up templates for displaying catalog information in a form specified by a customer.

The EC system core functionality is implemented using many Microsoft's component object model (COM) which are derived from the Active Template Library (ATL) tools. Each COM object encapsulates a specific functional role and provides a function interface that can be accessed by other COM objects or COM-enabled processes (such as Active Server Pages 70 in FIG. 6). A layer of abstraction consists of several COM components. It is these components that will be used in Active Server Pages (ASP) 70. This allows changing the implementation of any underlying component—to use a different database table, for example—without affecting any high-level program or business logic encapsulated in either ASP or COM objects ASP is using.

An advantage of using this additional layer of components is to allow inter-system transactions to occur over any transport that may be chosen in the future. Distributed COM was chosen to implement system to system conversations.

Advantage is taken of Direct Socket Connections to transfer data and messages between the Procurement and Supplier Systems. None of the applications using COM objects that talk to remote system know which technology is used to fulfill the request. They all call local COM objects' methods to do the task and are never aware of the fact that socket layer 55 or another transport layer was used to transport the request.

The customer server has a distinct communications module 96. This enables the customer server 34 to transmit documents and receive documents over a variety of protocols. The transport method currently used is a direct server to server Internet Protocol (IP) socket connection. This connection uses the standard HTTP protocol as used by Internet Web servers such as IIS and NETSCAPE® Commerce Server. The purchase order document that is sent from the customer server to a supplier is formatted to adhere to the OBI (Open Buying on the Internet) specification. All other documents are sent as per standard ANSI X.12 EDI specifications. The method for instigating a transfer of a document is via an HTTP POST operation to a waiting CGI program at the supplier site. The CGI program will decode the object and place the document as a text file ready for integration into a supplier order entry system.

The Following Off-the-Shelf Components are Used in Conjunction with the System

User Workstation Requirements
  Hardware/Operating System: A
  1. Any system that supports the operation of a Java-enabled browser.
  2. Network connectivity with an TCP\IP protocol connection.
  Software:
  1. Java-enabled browser, such as Netscape Navigator or Microsoft Internet Explorer.
  2. Connection access to Procurement Server.
Customer Server Requirements
  Hardware/Operating System:
  1. Windows NT (server/workstation) 4.0 operating system.
  Software:
  Microsoft Windows NT Server v4.0 operating system
  Internet Information Server v3.0 with Active Server Pages extension
  SQL Server v6.5 (recommended, other ODBC compliant database systems may be used).
  CryptoAPI v2.0 component of NT Server v4.0
  Motorola—CipherNet Toolkit v1.2a
  Procurement Server
  Bank ACH security
Supplier Catalog System Requirements
  Hardware/Operating System:
  1. Windows NT (server/workstation) 4.0 operating system.
  Software:
  1. Windows NT Server V4.0 operating system
  2. Microsoft Internet Information Server 3.0
  3. Microsoft SQL Server 6.5 (recommended, other ODBC-enabled Database may be used)
  4. Supplier Catalog Installation
  5. Motorola CryptoAPI V2.0
  6. Motorola products—CipherNet Toolkit V1.2a
Supplier Supply Order System Requirements
  Hardware/Operating System:
  1. Windows NT (server/workstation) 4.0 operating system.
  Software:
  Third-party EDI translator.
  Microsoft Windows NT Server v4.0 operating system
  SQL Server v6.5
  CryptoAPI v2.0 component of NT Server v4.0
  Payment Clearing Server
Payment Clearing Server System Requirements
  Hardware/Operating System:
  1. Windows NT (server/workstation) 4.0 operating system.
  Software:
  1. ACH specific processes
  All the Servers currently use Microsoft's SQL Server. All are completely ODBC compliant for ease of migration to other ODBC databases, e.g., Oracle.

The Purchase Interface and Administrative Interfaces run as Java applet suites within a Web browser (such as Netscape or Internet Explorer) and communicates with a buyer's Customer Server 34 using HTML via Microsoft's Internet Information Server (IIS) with the ASP extension. They are the user's point of contact with the entire System. The User Interface is important for that reason. Because users must find the procurement system 12 friendly, intuitive, and easy to use, committed to improvements in the User Interface (UI) as users suggest improvements or as additional features are incorporated in the future.

Because of Bank security concerns, at least one Service Bureau (SB) 48 is preferably provided. Each SB will physically consist of assorted network components implementing Internet Firewalls, the Payment Clearing Server functionality (i.e., transaction counting and optional ACH translation). An approved certificate authority 54 will be provide certificates for system security.

III. Security Implementations
  A. Overview
  EC security uses three main sections: system setup and hardware issues that are a concern before and during initial of the EC software installation; setup and configuration of an EC system after initial software installation but prior to normal system operation; and security issues and processes that are relevant during normal EC operation.

The certificate authority 54, Motorola, Inc. in the example, provides certificates of authority application, called CipherNet Certifier, and also a low-level security library, CipherNet 1.2 Toolkit, that is used by all higher-level security functions. Motorola uses RSA's TIPEM library to implement their library and certifier product.

From a security viewpoint, the EC system can best be described as an extranet (internet closed environment) server-to-server communication architecture. One customer server 34 communicates using EDI messages with several supplier or supplier servers 40, 42.

The Customer Server 34, the Supplier Server 40, 42, Certificate Authority 54, and Bank Servers 18 are software products which run on Windows NT Server v4.0 capable hardware. At Customer sites, it is the responsibility of Customer system administration personnel to configure their equipment, and to ensure that system installation and configuration meet internal customer standards for safe computing. For example, a system administration will probably wish to consider such issues as firewall policies, log-on security behind the firewall, hardware and network redundancy, backups, disaster recovery, physical access controls, etc. It is will recommended that every customer implement effective and properly configured firewalls between all machines running customer server software and the open Internet.

Buyers use the Customer Server 34 to communicate over the open Internet 14 with any of several Suppliers using EDI, ANSI or EDIFACT standard messages to Suppliers using a Supplier Servers 40, 42. The System utilizes open architecture design conforming with known standards, such as the OBI (Open Buying on the Internet), but from a security viewpoint is a closed business system because buyers and sellers are already established and trusted trading partners before using the EC System. The buyer's Customer Server 34 knows the identity of all Supplier Servers 40, 42 (and vice-versa), which obviates several security and business relationship problems which might be encountered if unknown or unregistered Suppliers were allowed to connect to the system.

It is a closed communication system because traffic is permitted only among pre-established and specially configured computers. Customer (and other) computer equipment not running system software cannot establish a communication link. No Internet services will be available (e.g., finger, mail, ftp, . . . ) from systems running Server software except for an HTTP daemon/per Server to service users operating at client PCs. HTTP is planned as the transport protocol of choice (for security reasons) when it is fully supported by an NT Server. Before any messages whatsoever can be exchanged between servers, each side must be authenticated for the other using authentication certificates signed by the central Certification Authority Server 54 (FIGS. 3 and 7) at a Service Bureau 100. Every message sent on the open Internet by any system Server is encrypted using RSA public/private key techniques, even prior to successful authentication. All messages are in limited, standard forms (e.g., EDI forms, PKCS messages, etc). No other communication over the open Internet 14 to, or from, a system Server is permitted or attempted.

All System Servers run under the Microsoft Windows NT Server v4.0 operating system w/Service Pack 3 and use NT file system and other security features. All System Servers must be physically protected by placement in secure locations. A properly configured (and located) NT Server 4.0 with Service Pack 2 or better meets U.S. Government/NSA C2 security as a server. It also meets the UK Information Technology Security Evaluation and Certification standard at the FC2/E3 level.

Users 24 typically connect to their Customer Server 34 across their corporate Intranet/LAN ($L_1$ in FIGS. 2, 6) using off-the-shelf Java-enabled browsers 111 (at least Netscape navigator 2.02 or Microsoft Internet Explorer 3.0—at Java v1.0.2). User names and passwords are encrypted during log-on using SSL services.

No additional software need be installed on a user workstation 28. In particular, no ActiveX or similar system-executable processes are ever downloaded to or executed on the user workstation/PC 28 by any part of the System; this was a deliberate choice to increase security. Java applets are used as visual enhancements for the browser running the Administrative Interface to the Customer Server 34; the applets do not, and cannot by design, have access to any part of the PC running the Purchase or Administrative Interface for buyer users. Applets are downloaded into the user's browser only over the Customer Intranet 28 and only from an Customer Server 34; at no time are Java applets ever loaded from the open Internet 14. The Purchase and Administrative Interfaces to the Customer Server 34 operate through server-side processing and dynamic server-side HTML page generation using Microsoft's Internet Information Server IIS 72 with the Active Server Pages extension 70. All user access to the Customer Server 34 is exclusively through HTTP, which provides a high degree of server encapsulation and security. Microsoft's IIS 90 acts as the web server for user browsers and serves as the gateway to the Customer Server 34 itself.

Figure 7:
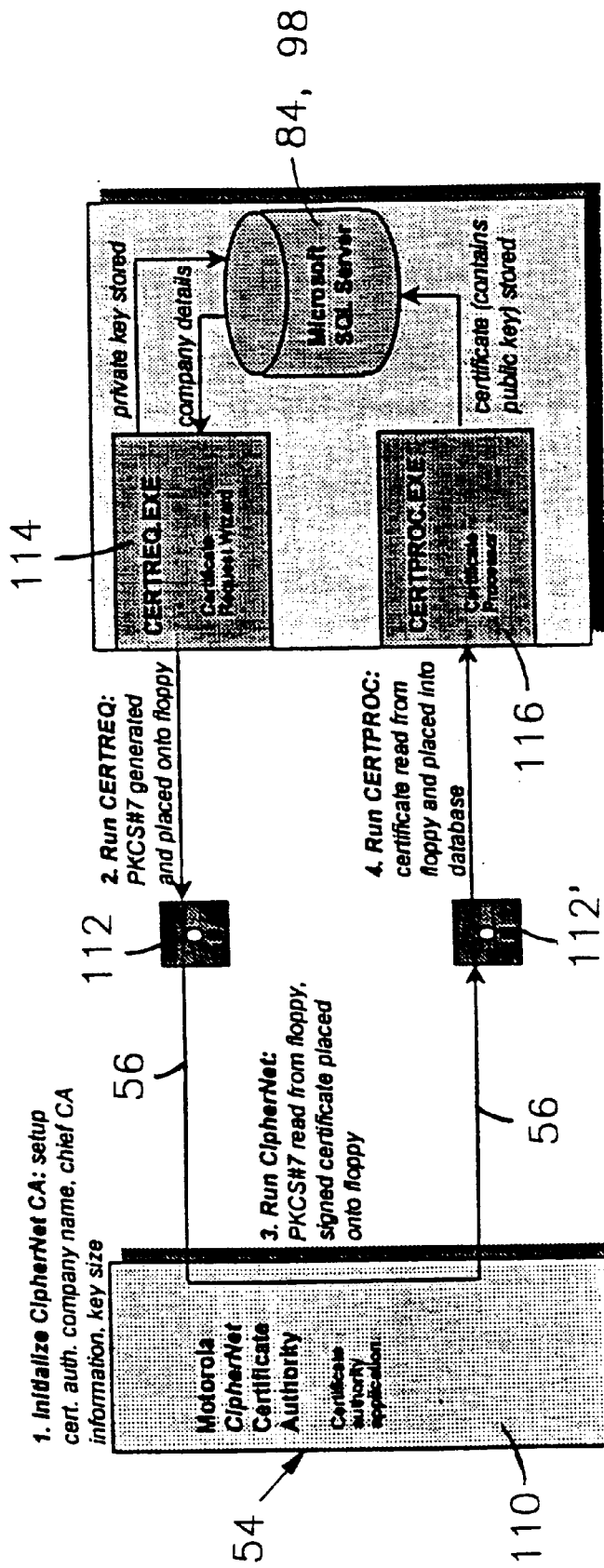
FIG. 7 is a generalized block diagram illustrating the procedure taken by a buyer and supplier to obtain public/private keys from a certification authority for security encryption/decryption of information flow in the EC system.

Server-to-Server communication security ultimately relies on public key cryptographic techniques as implemented in the RSADSI TIPEM library. The TIPEM library implements RSADSI's Public-Key Cryptography Standards. Referring to FIG. 7, the server 110 at the certification authority 54 function will be performed by Motorola's CipherNet application, which will run off-line. This certificate authority application will be managed and run by Service Bureau hardware at the location 54. Each System Server includes its own authentication certificate [C1] in all messages it sends; a Server-resident copy of Motorola's CipherNet Toolkit makes calls as needed to the TIPEM library to produce a PKCS package which contains a copy of its authentication certificate digitally signed by the SB Certification Authority. Only Servers need authentication certificates since Internet communication within the SB System is exclusively server-to-server; users 24 are authenticated by the Customer Server 34 using username/password authentication. Increased security by utilizing local certificates is an option the customer can choose for some or each user. Messages between Servers contain signed and encrypted EDI standard forms plus the sending server's certificate in a PKCS #7 compliant package. This allows the receiving server to be certain of (i.e., to authenticate) the sending Server's identity since only the sending Server's public key will successfully decrypt the signed digest, and the message digest itself prevents error, garble, and effectively all tampering with the contents of the message. Microsoft's COM objects is the remote procedure call mechanism and uses TCP/IP as its transport protocol.

The Customer Server 34 maintains a list of all valid supplier or vendor server certificates and user 20 profiles as well as usernames and passwords.

The private key used by each Customer Server 34 to authenticate itself to other Servers, never leaves the Server. Furthermore, even in memory, it exists only transiently in unencrypted form. It is secured on the Server with several layers of security measures. First, it is stored in the NT Server's Registry (which is kept on disk) in CipherNet encrypted form. The key needed to decrypt it is kept (also encrypted), in a large otherwise pseudo-random, file. Extraction and decryption of the secondary key requires access to assorted parts of particular system information and to a large block of system-generated pseudo-random data.

A Server's RSA public/private key pair comes into existence when a request to produce them is made of the local copy of the CipherNet Toolkit which in turn calls on the local copy of the TIPEM library to actually do the work. Referring to FIG. 7, the certificate request (as a PKCS #7 message in a file on a disk 112) will be physically brought to the Service Bureau 54 via the Customer's choice of secure transport 56. The Service Bureau-managed Certification Authority server 110 will digitally sign it, producing an identity certificate for that Server on disk 112' containing the Server's public key, among other data. The request to produce a Server's RSA key pair (which it must have to communicate any other Server) is made at the Customer's direction and only by the receiving Customer. The resulting digitally signed authentication certificate for the Server's public key will be installed on a Customer's system at the Customer's site by certificate authority personnel under Customer supervision, using a Customer-chosen and Customer-entered password. At no time will a signed Server authentication certificate from the certification server, not already installed on Customer hardware, exist outside the Customer Authority except in the care of an Customer Authority employee.

Motorola, Inc. will provide the Customer Authority with a certification authority application, CipherNet Certifier, and with a high-level security library, CipherNet 1.2a Toolkit, which is used by all security functions. Motorola uses RSADSI's TIPEM low-level library to implement both their library and certifier product.

Server-to-server security uses public/private key techniques based on the RSADSI TIPEM library. Motorola's CipherNet Certifier application will be run off-line on a stand-alone NT workstation 110 providing signed authentication certificates for all System software at all sites. This certificate authority will be managed and run by an approved Customer Authority on it's hardware. Each server uses a local copy of Motorola's CipherNet Toolkit to generate signed and encrypted messages in PKCS #7 format for exchange with other Servers; these always contain a copy of the Certification-Authority-signed certificate for that Server. Messages contain EDI standard forms, plus the sending Server's signed certificate. They are readable only by the intended recipient. This allows the receiving Server to authenticate the sending Server, by successfully decrypting the sender's certificate and then the signature of the Certification Authority Server. Users do not have certificates since communication is Server to Server; users are authenticated by the Customer Server 34 using username/password authentication.

B. Initialization

In order for the EC system to begin standard operation, each EC server must have its own certificate containing its public key, a private key, the server's information (AVA, DER), and the signed certificate of CipherNet.

Note that user or customer browsers 11 do not require their own certificates. Certificates are not necessary (but optional for higher security requirements) at the user side since the Customer Server 34 authorizes users by username/password authorization. Server to server communication use server certificates to authenticate servers.

ACH Initialization

1. Bank's ACH security software is run to perform key exchange with bank ACH. Bank's ACH security software is initialized using the following steps:
1. User prompted to set initial password. Buyer can protect access to the product and keys via having no password, one password or two passwords.
2. Enter bank's ACH security software license information, including security code from Prime Factors.
3. To create Buyer company details:
4. Use Setup/Select Company option to create Buyer company details.
5. Prompted for Company ID (15 chars, appears in EDI ISA segment, may be DUNS)
6. Prompted for Company Security ID (4–16 chars appears in EDI SIS segment)
7. Prompted for Directory for Security Files.
8. To add Bank ACH as the X12 trading partner:
9. Use Setup/Setup Partner Information option.
10. Select Add Partner button.
11. Prompted for partner ID (4–16 chars, used to identify Bank ACH for 824 and 997 messages)
12. Prompted for Type of Files to be Secured for this Partner, select X12 only
13. In Set X12 Security Options accept default settings. All messages are secured using both authentication and encryption, No filtering, Functional Acknowledgements not secured.
14. Use Set Advanced X12 Security Options. (Mainly needed to maintain compatibility with older versions of some other X12 security products).
15. Use machine Native CBC Zero Padding.
16. Use 16 Byte Hex encryption IV.
17. Generate Functional Acknowledgement Messages (997).
18. Character Set Translation (if using EBCDIC).
19. Translation Table Name (if using EBCDIC).
20. Authentication Character (if using EBCDIC).
21. Use Key Information option.
22. Accept default encryption and authentication key names.
23. Assuming manual key management; from the Manual Key management screen, for each key (i.e. authentication key and then encryption key) enter date and time from which key is to be valid, then enter each of the three 16 hexadecimal character strings which are mathematically combined to generate the key.
24. The three strings need to be written down and sent to the bank 18 (the bank will do likewise to generate their equivalent key.)

Bank's ACH security software suggests the following for the most secure key exchange:

1. Buyer generates 1st Key Component and sends to Bank.
2. Bank enters 1st Key Component.
3. Bank generates 2nd Key Component and sends to Buyer.
4. Bank generates 3rd Key Component and sends to Buyer.
5. Buyer enters 2nd Key Component.
6. Buyer enters 3rd Key Component.

Procurement System Initialization

Administrative functions allow the Procurement System 12 administrator 58 to add users 24 and their profiles to the Customer Server 34. Access to these administrative functions is accomplished through a standard user web browser 111. Special administrative functionality is enabled when it is determined by the Procuring system that the user that is trying to log on has special administrative privileges. Administrators access to the Customer Server 34 through a username/password combination that is identical to the normal user access procedure. The user profile allows the administrator to restrict a user's catalog view to purchasing profiles to be edited and sets spending and types limits on purchase order items. User profile information is located on a SQL Server database 54 on the Customer server 34, which is secured physically from direct casual access.

Motorola CipherNet Initialization

Motorola specifically details CipherNet installation and usage in the Motorola CipherNet Certifier user manual. Initialization of the CipherNet application is performed by the person selected as the Chief Administrator 58.

To initialize CipherNet, the Administrator selects "Initialize" from the Certificate Authority menu in CipherNet. A form is then presented which requires the following information:

1. Company Name: certificate authority company name.
2. Key Length: select the maximum allowable amount which is currently 1024.
3. Validity Period: 3 months.
4. Chief Administrator Name: administrator's name
5. Chief Administrator Phone Number: administrator's phone number.
6. Password: Chief Administrator's secret password. This allows access to administrative functionality in CipherNet.

Upon successful initialization, the following is created by CipherNet:

1. Chief administrator account.
2. RSA root key pairs.
3. CipherNet database.

CipherNet maintains a log file of all actions performed by the administrator.

At this point, CipherNet is now ready to accept certificate requests from a floppy disk.

Generating a Certificate Request Using CERTREQ.EXE

Each Procurement and Supplier server must have its own certificate. Furthermore, each certificate must be signed (certified) by CipherNet. In order to obtain a signed certificate from CipherNet, each server must create a certificate request. Referring to FIG. 7, the format of the request is a PKCS#7. The process that creates this request is CERTREQ.EXE 114, the Certificate Request Wizard.

A Certificate Request Wizard 114 makes certificate requests. During a request generation the wizard generates a PKCS#7 certificate request. It also generates a set of public and private keys. The certificate request contains the public key, username (known as the DER-Name), and other company information (stored as AVA details):

1. CompName The company name
2. Street Street Address
3. Town Town/City Address
4. State State/County Address
5. Internet E-mail Internet E-mail Address
6. Country Country Address
7. Postal Code Post/ZIP Code The generated key size is 1024-bit. Motorola's CipherNet toolkit is responsible for key pair generation.

The wizard 114 outputs the certificate request into a flat file on a floppy disk 112 82. This file, CERT1024.REQ, is a binary formatted PKCS#7. This file is physically and securely transported using registered mail or other secure medium 56 to the CipherNet system 110 for signing using a trusted agent.

The wizard 114 also writes the private key to the SQL server database 84, 98 (FIGS. 5, 7), which is later used by the security COM component during program operation. Although the public key is also defined, it is not yet saved to database. This is because the public key is passed in the certificate request, and eventually returns embedded in the signed certificate. The signed certificate, and consequently the public key, is stored by CERTPROC.EXE in the Certificate Processor 116.

IV Operation Controls

There is a Customer Server 34 at the Buyer's location. This system 12 is responsible for encrypting and sending EDI requests to Suppliers, for notifying the Bank Server 18 of billable transactions, and of sending messages to the bank ACH authorizing payment of invoices. In the last case, the Payment Clearing Server takes the message and translates the encrypted message from calls to SMTP mail and routes it to the Bank's Server 18 which translates the SMTP mail back into EDI format and normal Bank ACH processing continues. EDI forms 997 and 824 are generated and sent back to Bank Server, translates the SMTP mail back to COM calls and forwards it to the Customer Server 34. The Bank Server 18 decrypts the message and logs the transaction.

There are no manual processing procedures built into the Bank Server workflow. However, there are exception handling procedures that are handled manually. Such processes handle message routing exceptions, e.g., when no EDI 997 (i.e., functional acknowledgment) is received from the Bank's ACH. In such cases, the operator will be notified after a predetermined period of time and requested to re-send the message after checking with the bank. Due to the use of electronic mail as the transport vehicle to and from the bank's ACH, this procedure is in place for message failures.

A transaction or server counter 52 and billing module for the Service Bureau 48 is provided. Manual input occurs when a new Customer is set up and the transaction rates which have been agreed to by contract with the Customer are entered into the Counter Server 52. The invoicing of Customers will be done automatically using information provided by the Server 52.

The Counter Server 52 produces customer billing information, based on the billing period entered into the customer profile, to automatically invoice the customer directly. This billing procedure can interface to the Service Bureau's general ledger accounting. Full audit trails and various reports on customer activity can be provided by the Bank Server 18 and Counter Server 52.

In order to audit and control transaction count accuracy, all transactions may be audited against the customer's Procurement transaction counter 52. Users on the system will be subject to privileges and approval, e.g., a user may have access for Customer comments and have viewing privileges only, but not be allowed to change the rates charged to the customer.

The SB 48 and Bank Server 18 can provide various reports on Customer transactions. Users can use a report writer to extract information from the database. Audit trails on both ACH and billing transactions can be kept by the Bank Server, so that all ACH transactions have a full event history. The Bank Server will also provide a user event log, which will include an entry for each instance in which a user alters information on the system. These alterations will be logged and available for audit.

V. Systems Operation

A user will perform the following functions during a standard EC session:

1. User log-on to LAN/intranet 28
2. User connects to user log-on page via issued URL.
3. User enters user name and password.
4. User name and password sent to Customer Server 16 for authentication.
5. Authenticated user is presented with his purchasing profile details.
6. For each item selected, the line item detail is sent from the Supplier Catalog Server 24 to populate the purchase requisition.
7. User reviews the purchase requisition that is sent to Customer Server for processing.
8. The Customer Server 34 verifies the purchase requisition against the user's profile (including spend limit).
   (a) If the order is approved, the Customer verifies the purchase order.
   (b) If the order is not approved, the order is routed to the user's supervisor for approval. (followed by step 9).
9. An EDI Purchase Order (850) is generated.
10. The EDI Purchase Order is encrypted using the public key from the supplier's certificate, signed using the Customer Server private key and placed in a PKCS #7 along with the Customer Server certificate. The encrypted/signed Purchase Order is sent to the Supplier.
11. The Supplier's Server 40 decrypts the purchase order with its private key, and verifies the signature by decrypting it with the public key contained in the buyer's certificate contained in the PKCS #7.
12. The Supplier Server 40 stores the buyer's public key for use in encrypting messages back to the buyer.

13. A similar process of encrypting/decrypting, signing/verifying continues for the subsequent purchase order acknowledgement, advance shipping notice and invoice.

14. The Customer Server 34 triggers ACH payment (using FIMAS, EDI-820) mechanism.

Many of these functions use common security components to perform their tasks. For example, all EDI message transmissions between the Supplier and Customer Servers use a common encryption/decryption and authentication module.

User Log-On

IIS 72 uses standard NT security when it operates, which means that even though it is triggered by a remote process it still needs to log on to some NT account in order to operate. Since it is neither feasible nor practical to have an account for every client browser that connects (even if it knew them all!), ITS by default uses an anonymous account to log onto NT. However, IIS is configured during installation to disallow anonymous connections for security reasons. This is necessary to stop unauthorized Intranet client connections to the IIS. Only users that have registered with the system (added to the SQL database 84 by the Purchaser administrator 58) should gain access to the Customer Server 34 through IIS. But disallowing anonymous connections forces IIS to automatically prompt the user with a standard NT logon dialog (username/password). Since the user does not or should not have an NT account on the Customer server, a method to allow IIS to first-validate the user against the Customer Server SQL database 84, and, if found, second-allow IIS to log on using a 'known' account. An information server API (ISAPI) extension obtains the username and password, validate these against the database, and logon using the known account. The known NT account would have been previously created by the Procurement Server administrator. Its name and password must match the contents of the ISAPI extension that works by substituting the user-entered name and password (which was used to validate against the database) with the known NT account name and password which is stored in the ISAPI extension. The password is not required to be known by anyone other than the administrator.

The username/password is encrypted when it is transported from the client browser to the server using SSL 2.0, which is inherently provided by using IIS 3.0 and a modern browser.

The user connects to the supplier's ITS site 70 using the Customer Server ITS, which obtains the supplier's URL from the Customer Server database 84 and connects to the supplier's IIS (Supplier catalog server 42). The Supplier catalog server 42 receives the Customer Server 34 certificate as a moniker in the URL during the initial connection. The Supplier Server can authenticate this certificate to confirm that a valid user is connecting to the catalog. Also, a buyer profile code is sent as a moniker to the Supplier Catalog Server 42. The Supplier Catalog Server 42 uses Active Server Pages 70 to dynamically create HTML catalog pages using data from its resident SQL Server database 98. By evaluating the buyer's profile, the Supplier Catalog Server 42 can custom display catalog information and pricing specific to the buyer or buyer's organization.

The Customer SQL Server database 84 contains a list of valid Supplier Server URLs and their certificates. The Customer Server 34 provides an administrative function that can download Supplier certificates at any time. These certificates are not validated at this point since any invalid certificates—such as certificates that haven't been signed by a common root—will be discovered immediately when the Customer Server 34 receives an EDI message from the Supplier Server 42. The Customer Server authenticates all EDI messages that are sent from the Supplier Server, which will have been encrypted and signed by the Supplier Server.

EDI messages are encrypted and signed using a PKCS #7 (RSA Cryptographic Message Syntax Standard v1.5) format. The transport mechanism does not need to provide any additional cryptographic security, however, an indication of the contents of the PKCS #7 (e.g. no clear text message indicating "credit card details") will not be made to discourage attacks. The PKCS #7 features:

1. Symmetric Encryption Session Key Size/Algorithm: 56 bit DES
2. Asymmetric Encryption Key Size/Algorithm: 1024 bit RSA (Using Supplier's 1024 bit public key)
3. Message Digest Algorithm: MD5
4. Message Authentication Key Size/Algorithm: 1024 bit RSA (Using Buyer's 1024 bit private key)

ACH Payment—FIMAS Security

Figure 8:
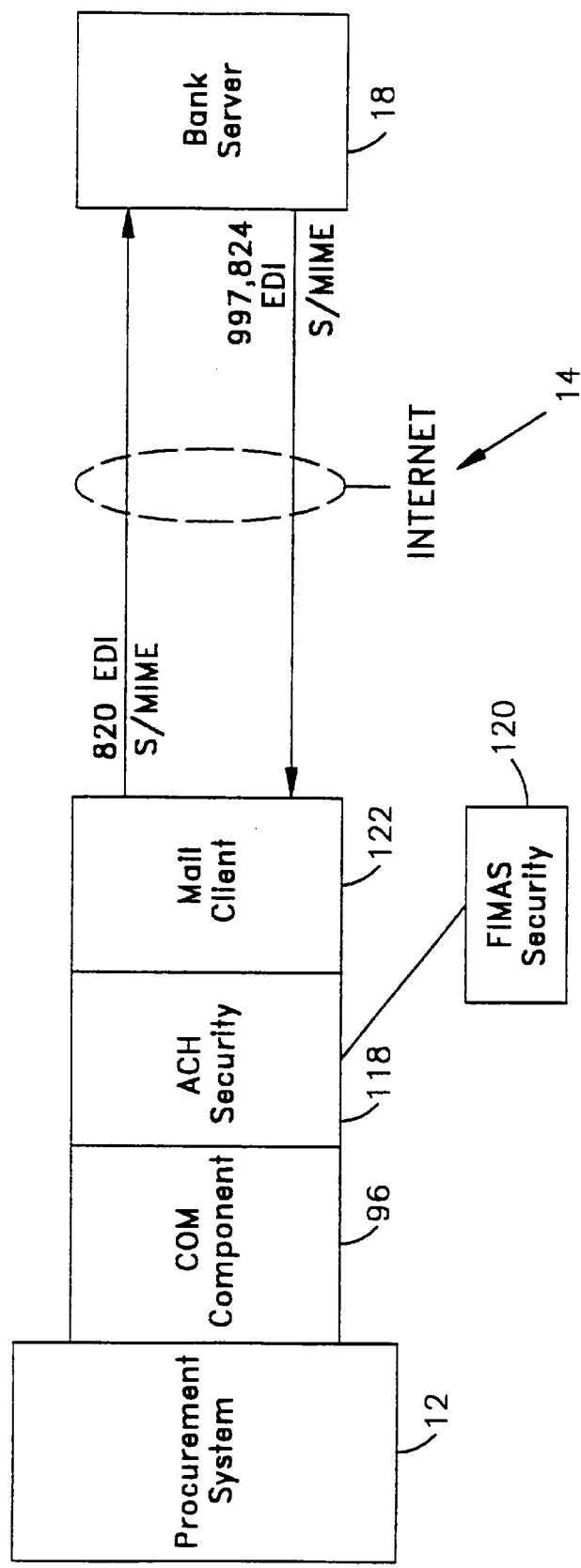
FIG. 8 is a block diagram illustrating ACH security implementation between the procurement system and the bank server.

Referring to FIG. 8, the system will leverage the existing Bank's Templar Gateway when sending 820 EDI messages that are required by the Bank's ACH payment mechanism for account settlement. A mail client process will create a Templar-compliant MIME message that is sent to the Templar Gateway at the bank. The message is in the bank-specified 820 EDI format. Bank's ACH security software will be used to manage FIMAS keys and MAC and encrypt outgoing 820 messages.

The following steps illustrate the procedure that the system will use to settle accounts using the ACH payment mechanism:

1. A buyer or customer registers with ACH using standard existing ACH Security 118 procedures, and a FIMAS Security 120 key pair is sent via registered mail.
2. A component is triggered by the Customer Server system 12 to perform ACH payment. A bank-specific 820 EDI message is created.
3. The 820 EDI message is MAC'd and DES encrypted (FIMAS).
4. The mail client application 122 packages the encrypted and MAC'd 820 EDI message into a MIME mail message and mails it to the bank 18.
5. The bank passes the 820 EDI message to CCAP, which then passes the message to ACH. A response is generated and eventually received by the bank.
6. The acknowledgement EDI message (997 or 824) is E-mailed by the bank 18 to the mail client application.
7. The mail client application passes the EDI message to the ACH COM component 96. The COM component 96 reconciles the acknowledgement EDI message against a list of outstanding 820 messages. If an 820 EDI message is not acknowledged within a user-defined amount of time, an administrative alert is sent.
8. An appropriate acknowledgement message and/or response is sent by the ACH COM component 96 to the system 12.

EDI Specification

Where applicable, EDI messages will be used to communicate information between applications forming part of the Electronic Commerce solution, a system that enables suppliers and corporate purchasers to supply and purchase goods and services electronically. Purchasing orientated EDI messages will be used to communicate purchasing information. Purchasing information sent will be constrained by the ANSI.X12 version and implementation standard chosen. Bank Financial EDI messages will be used to communicate settlement information between the system's servers. Settlement information sent will be constrained by the bank's ANSI.X12 implementation standard.

| EDI STANDARD | ANSI.X12 |
|---|---|
| Messages: | 850, 860, 810, 855, 865 |
| EDI Version: | 3050 |
| EDI Implementation: | Intelisys reduced FED00A |
| Message: | 856 |
| EDI Version: | 3050 |
| Message: | 857, 864 |
| EDI Version: | 3040 |
| Message: | 977 |
| EDI Version: | 3040 |

Buyer Generated
  850 Purchase Order
  860 Purchase Order Change Request
  820 Payment Order—For ACH Payments [820ACH (003020)]
  820 Remittance Advice—For ACH Payments [Based upon 820ACH (003020)]
Supplier Generated
  810 Invoice
  855 Purchase Order Acknowledgement
  856 Ship Notice/Manifest
  857 Shipment And Billing Notice
  865 Purchase Order Change Acknowledgment
Buyer & Supplier Generated
  864 Text Message (Query)
  997 Functional Acknowledgment
ACH Generated
  824 Application Advice
  827 Financial Return Notice
  997 Functional Acknowledgment As there is only one functional group with one transaction, the date and times in the ISA and GS may as well be fixed to be the same.

The absence of TXI segments from an 810 will indicate that the Supplier has not included tax in the Invoice and the Buyer needs to add this for themselves.

There is no Federal standard to base the 857 or the 864 upon.

The first four characters of the Group Control Number (occupying data elements GS06 and GE02 will identify the batch. The last five characters will sub-define unique transactions within a batch.

For the 860 and 865, the POC segment will only be used for line items which are changing, whether additions, deletion or amended quantity. The total in AMT will, however, reflect the new overall purchase order value including line items not changing.

827 is only generated as a result of an exception, i.e. insufficient funds, account closed etc. By the nature of the fact that large corporates will be using the system initially it is expected that there will be little or no 827s to process, so initially the system will not process these and they will be handled out of bands.

ACH can receive a 997 from the Buyer (as a reply to the 824 and 827) but does not process it.

Initially, a separate 820 message is used to settle each Supplier. 820s will not be batched into one message. The definition of the 820 below reflects this. This also fits in with required functionality, where buyers will have different settlement periods with different supplier trading partners and will settle at different times.

The exact format and usage of 824s are defined during the setup process with bank. Initially it will be suggested that the "One 824 in response to each 820" configuration is required (i.e. send the bank ten 820s, receive ten 824s back), particularly as separate 820 messages are sent.

The 820 (Payment Order—For ACH Payments) specification was based upon a CCD transaction where no information in addition to the payment information is sent. The 820 (Remittance Advice) will be used to indicate to the supplier which invoices are being paid and includes additional RMR segments for this purpose.

The definition of the 824 is based on the assumption that one 824 will be sent in response to each 820. This is satisfactory, as only one 824 per interchange will be sent. This will allow the bank to indicate whether each individual 820 transaction was accepted or rejected. This request needs to be made to the bank when each customer is set up.

A 997 indicating a syntactically acceptable message will only include the ISA, GS, ST, AK1, AK9, SE and IEA segments, i.e. no AK2, AK3, AK4 or AK5. In this event AK901 indicates that the whole functional group was acceptable.

Currently assumes that TRN02 can contain a remittance number which will be printed in supplier's statements. This will allow suppliers to reconcile invoices against payment. Waiting for confirmation whether TRN02 is communicated when BPR05=CCP (indicating CCD+), or whether BPR05=CCD is sufficient.

Figure 9:
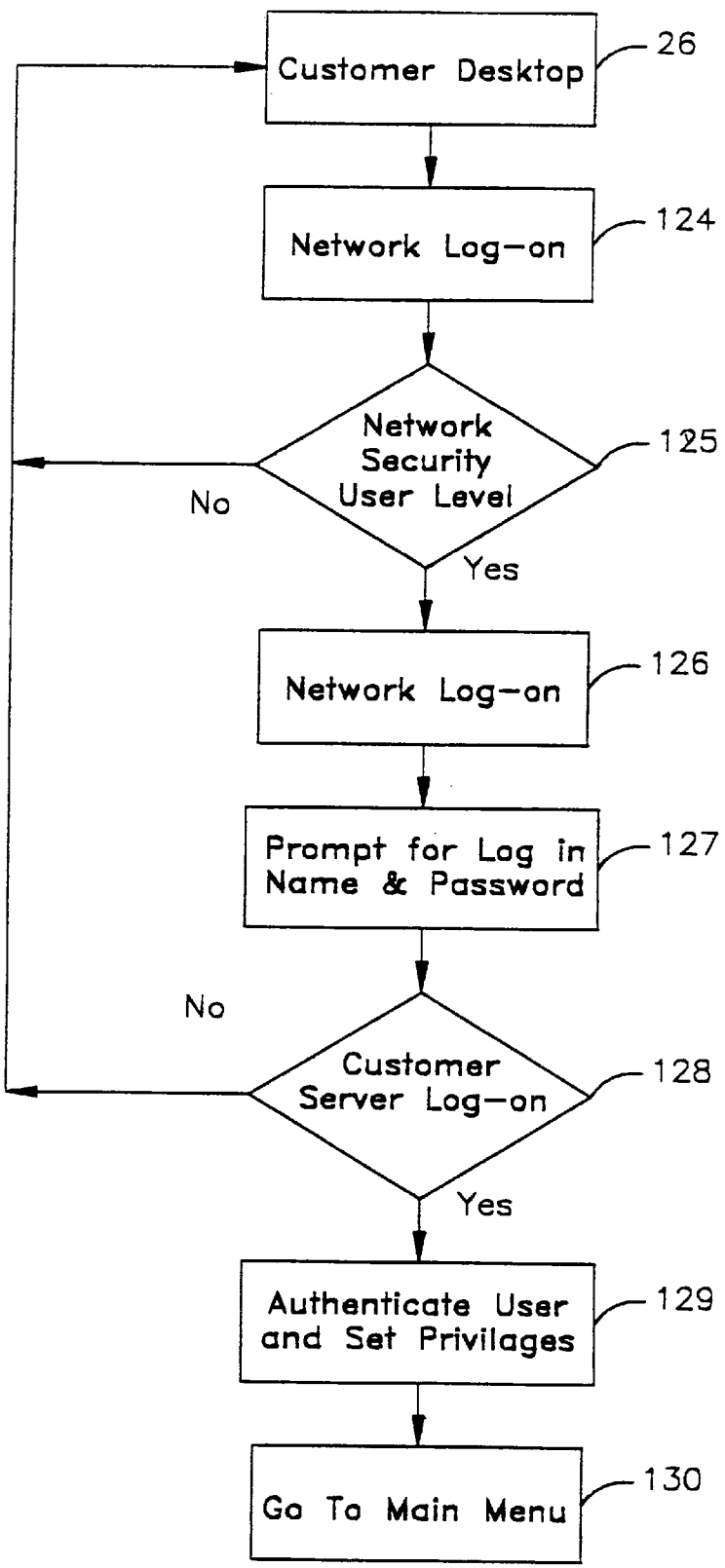
FIG. 9 is a flow chart for initial log-on by a user at a terminal of the buyer organization to gain access to the "main menu" on the customer server.

Referring to FIG. 9, the log on procedure by a user 24 for initial access to the system is illustrated. From the desktop or terminal 26, attempts to log on, at 124, 126 triggers a user's terminal to first be checked for network security at 125. Only if the network security user level has been satisfied does the desktop prompt the user to enter name and password at 127. Only if the proper IDs have been entered and logon security has been satisfied the Customer Server 34 authenticates the user 24, at 128 and set the user's privileges or predefined purchasing parameters and/or limitations, at 129. Once this has been established, the terminal 14 provides access to the Main Menu at 130, shown in FIG. 10.

The user 24 has a number of options in the Main Menu 131, including making a purchase (131a), administrative tasks (131b) (only if Customer Server has identified user as an administrator), review tasks waiting (131c), check order status (131d), review reports (131e), obtaining purchasing instructions (131f), changing the password (131g), or reviewing user feedback (131h). This Main Menu is illustrative and other options may be added and shown options may be deleted if a purchaser does not require one or more of the functions shown.

Figure 10:
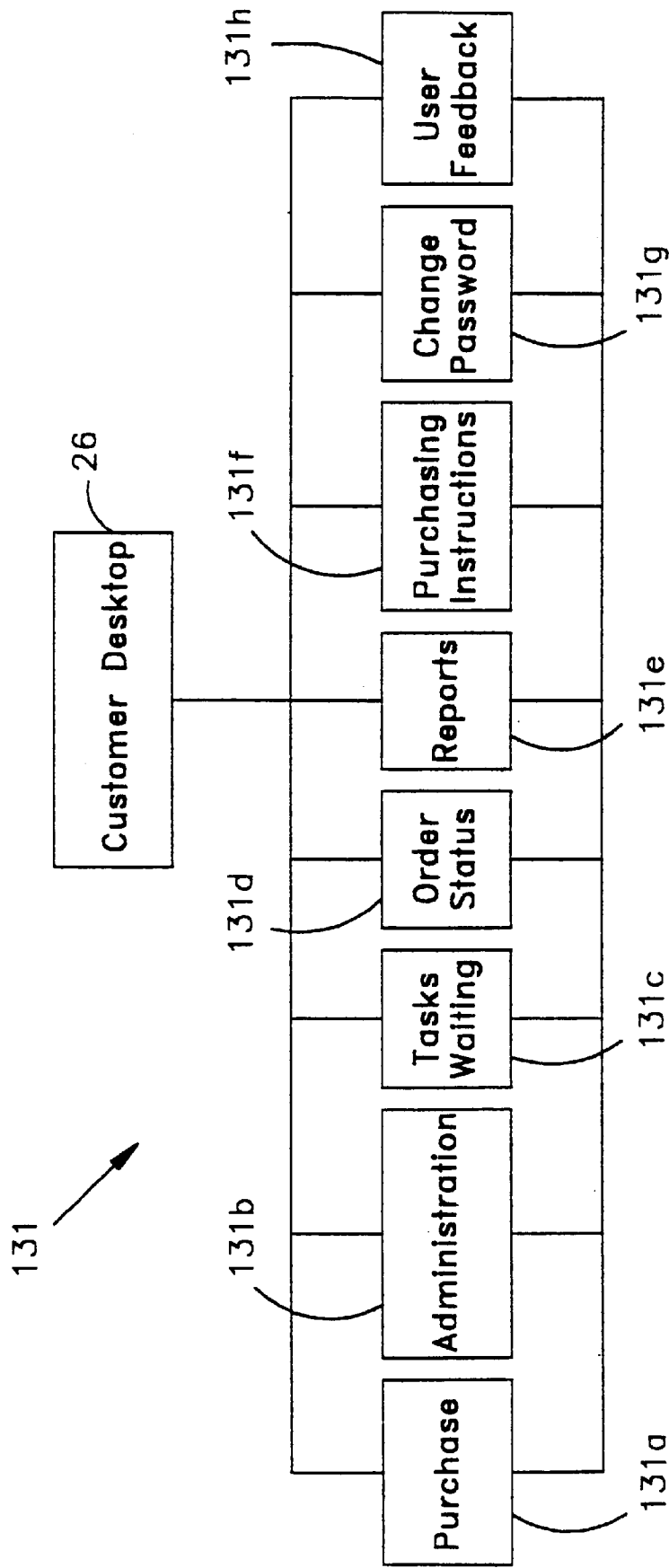
FIG. 10 is a block diagram representing the "Main Menu" at a user terminal after successful log-on by the user at the buyer location.
Figure 11:
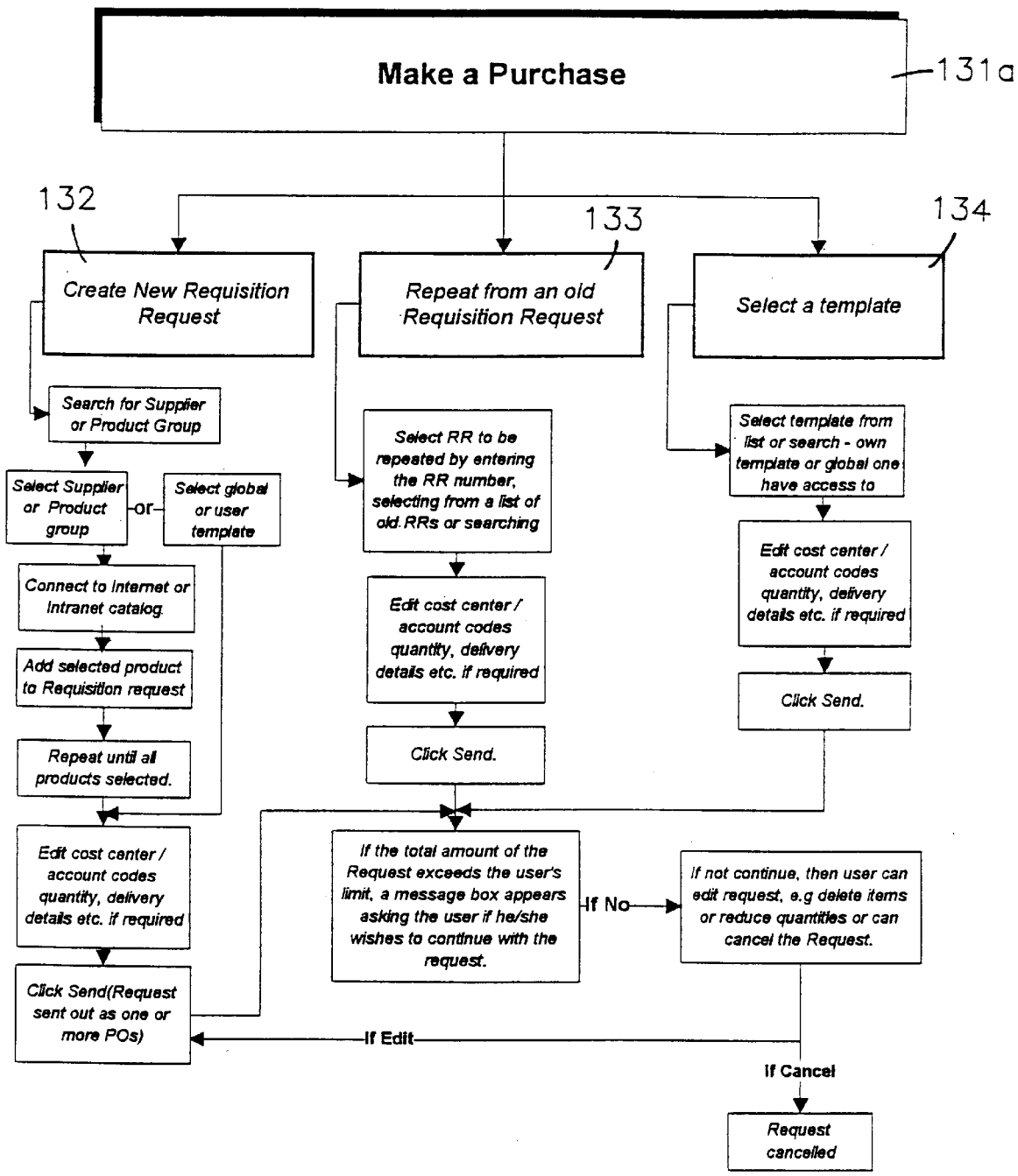
FIG. 11 is a flow chart representing the options/steps permitted by the customer server to a user at the buyer location after the "purchase" option has been selected from the "Main Menu" in FIG. 10.
Figure 12:
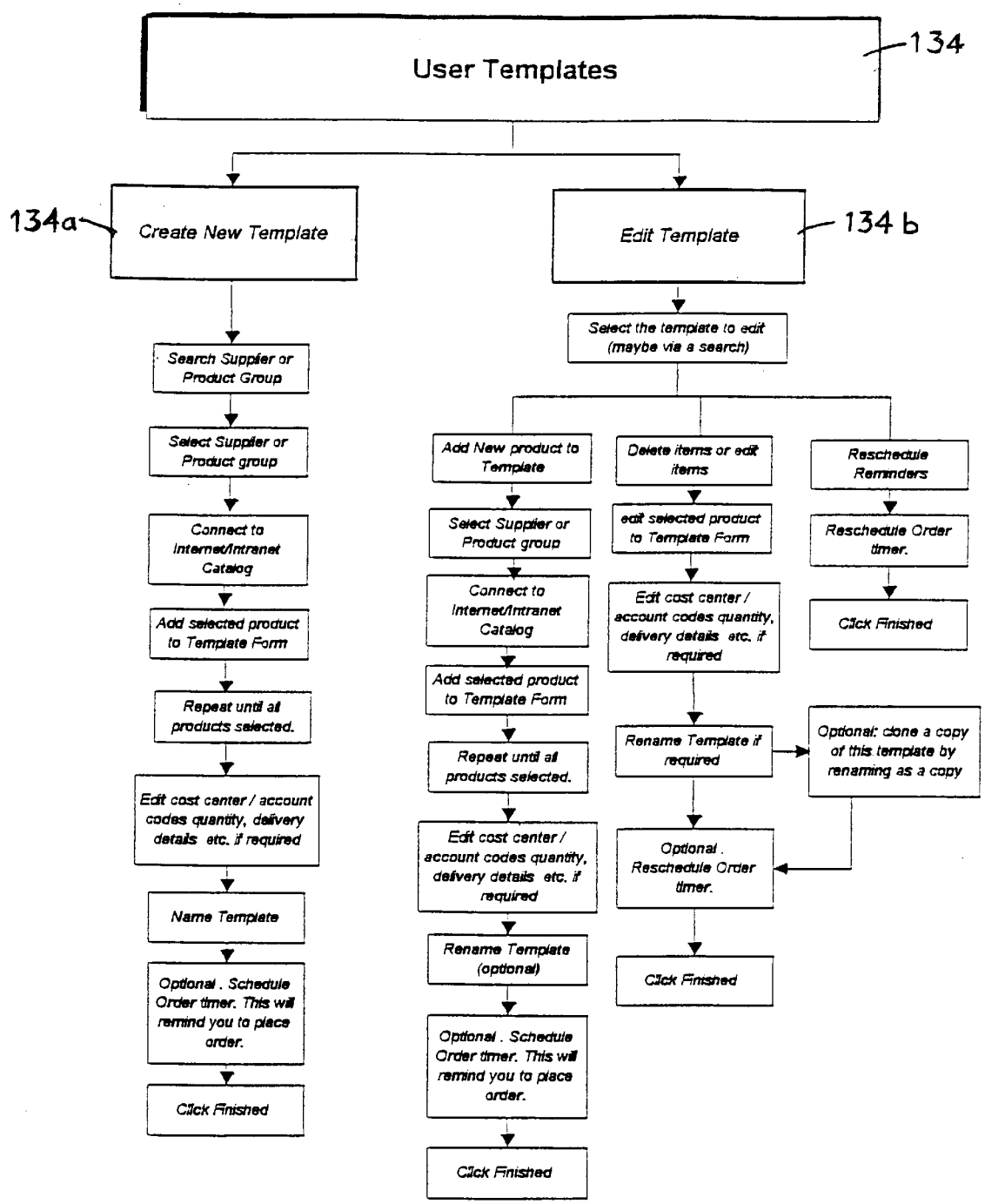
FIG. 12 is a flow chart representing the options/steps permitted by the customer server to a user at the buyer location after a decision has been made to create or edit a template after the "Select A Template" option has been selected in FIG. 11.

FIG. 11 illustrates the options when an authenticated user selects the "purchase" option 131a in FIG. 10. The user can create a new requisition request (132), repeat an old requisition request (133) or select a template (134). When selecting a template at 134 in FIG. 11, the user can also create a new template (134a) or edit an existing template (134b), as suggested in FIG. 12. In each case, the user is prompted to provide instructions or information. The steps are, in each instance described in the blocks. In each case, it will be noted, the user's request is compared with the authorized limits for the user. If any of these limits or parameters are exceeded, the system interrupts the procedure and also the user if the user wishes to proceed with the request. If the answer is "no", the user may edit the request to bring it with the specified limits. If the answer is "yes", the requests sent to a supervisor's terminal for review. When a user is also an administrator, authorized to access management modules, the "Administration Main Menu" 131b can be accessed by electing the "Administration" option 131b in FIG. 10. The "Administration Main Menu" provides the administrator 58 with the following options: account wrapping 135, system functions 136, employees 137, accounting set-up 138, reports 131e, supplier management 140 and payments 141.

Again, the options in the "Administration Main Menu" 131 in FIG. 10, modules may be added or deleted to serve the specific needs of a buyer or customer.

By way of example, FIGS. 14–24 illustrate some typical options that can be selected from one or both of the aforementioned menus 131 and 131b. Thus, in FIG. 14, the flowchart of the software module for setting up and maintaining suppliers (139a) is illustrated when selecting the "Supplier Management" option 139 in FIG. 13 after connecting the supplier's catalog and specifying portions of the catalog to make available, the administrator, after further tailoring the supplier details, renders the supplier "active" so that users can now requisition products/services from this supplier.

Figure 13:
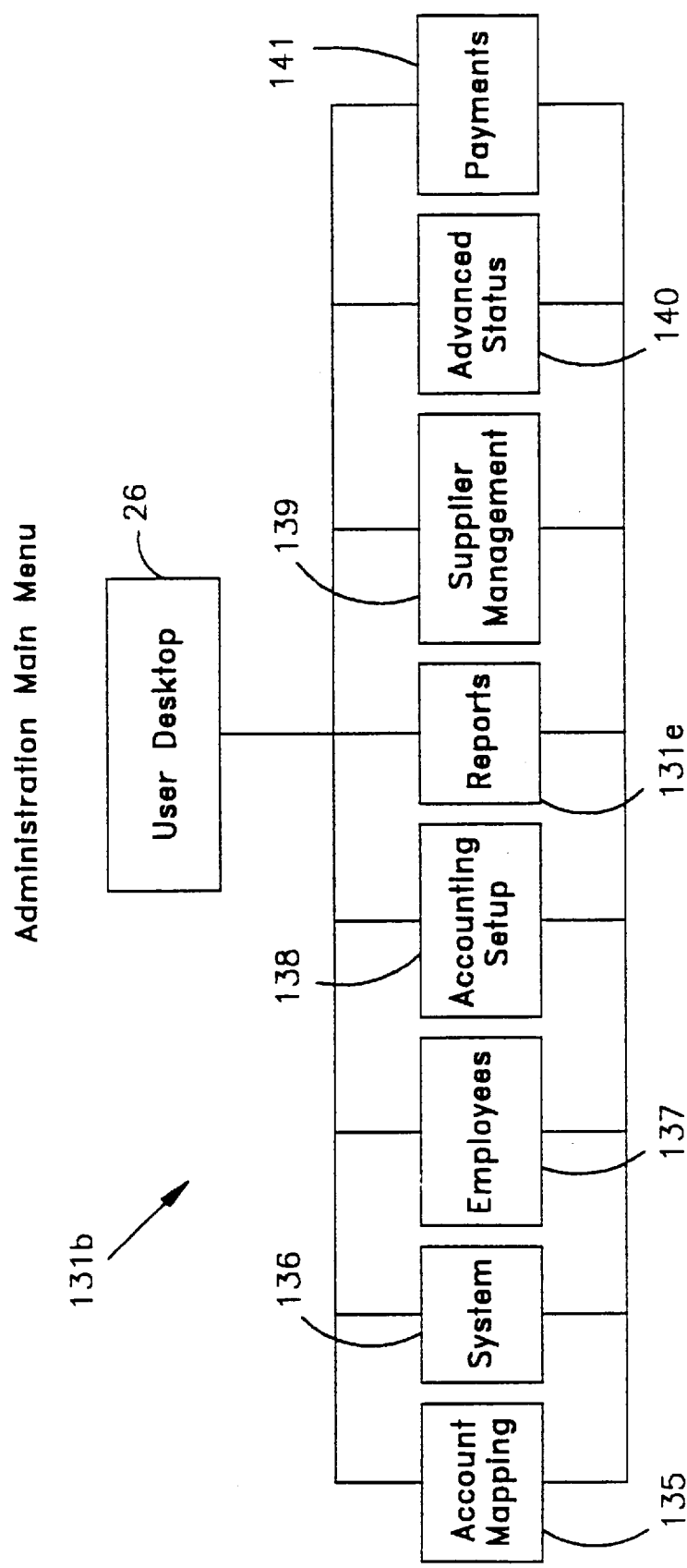
FIG. 13 is a box diagram representing the "Administrative Main Menu" at the user terminal after the "Administration" option has been selected by a user from the Main Menu shown in FIG. 10, when the user is authorized to access the administration features of the customer server.
Figure 14:
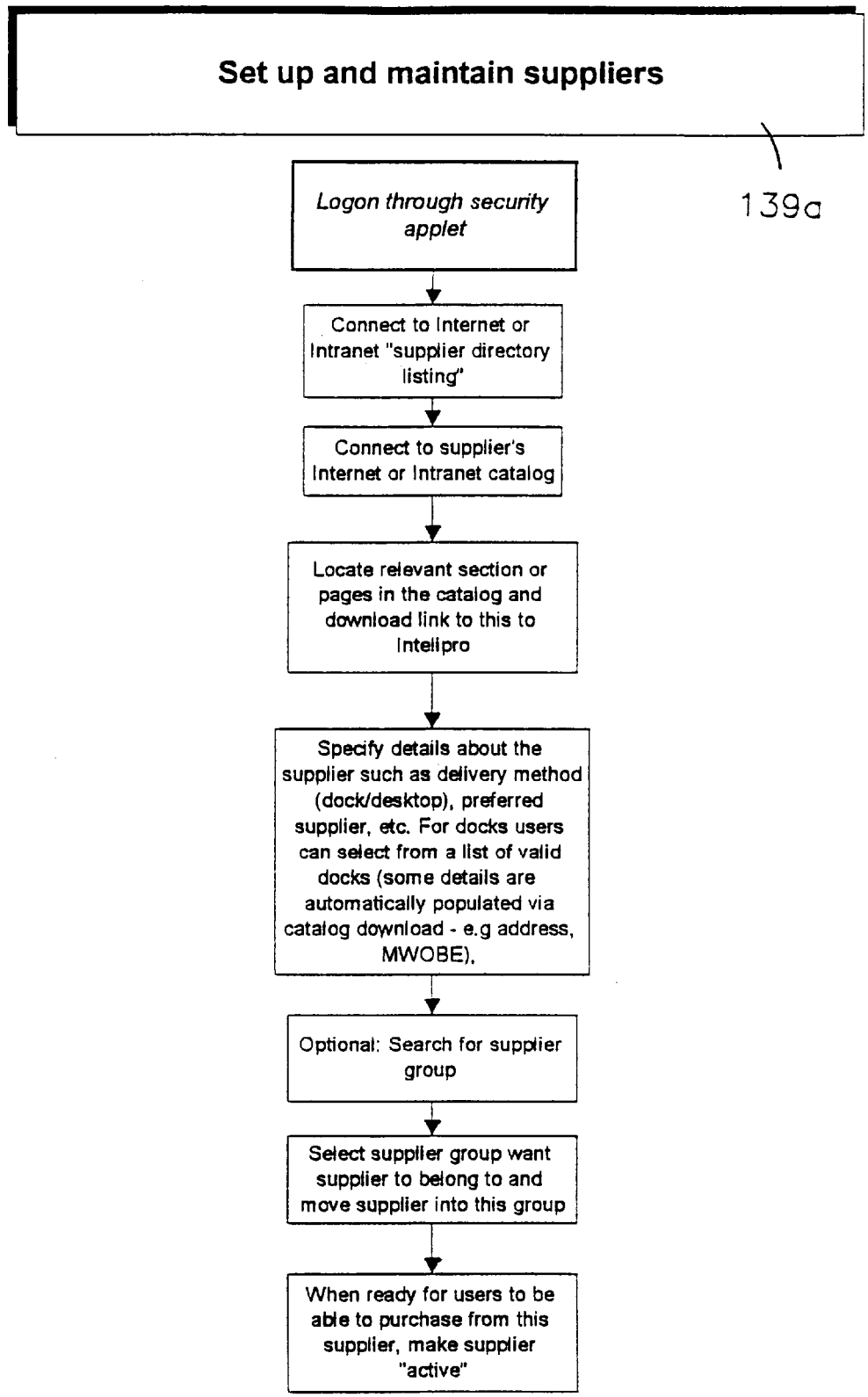
FIG. 14 is a flow chart representing the options/steps permitted by the customer server to a user at the buyer location after a decision has been made to access the "Supplier Management" module shown in FIG. 13 to set up and maintain supplies.
Figure 15:
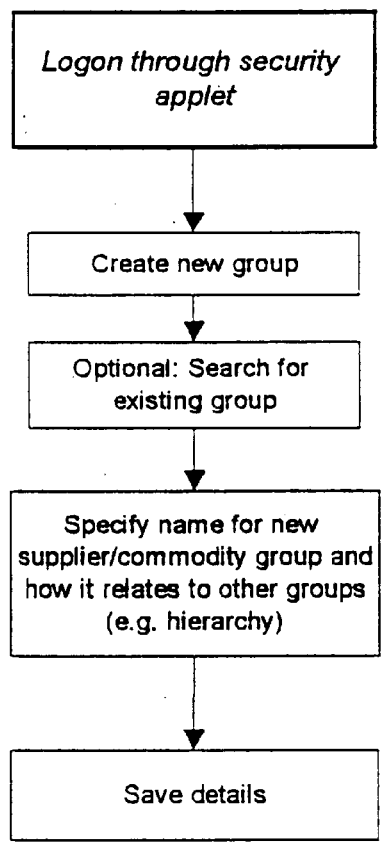
FIG. 15 is a flow chart representing the options/steps permitted by the customer server to a user at the buyer location after a decision has been made to access the "Supplier Management" module shown in FIG. 13 to set up and maintain supplier groups.
Figure 16:
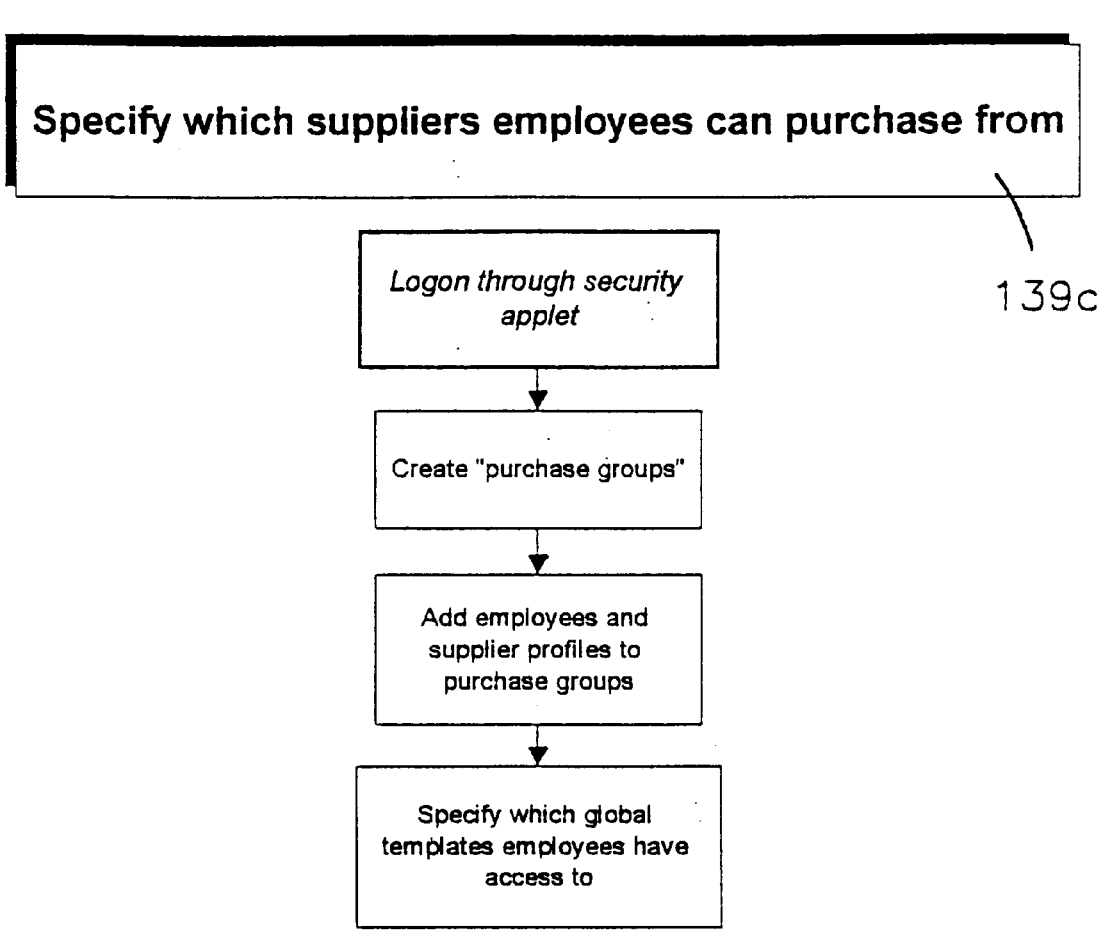
Figure 17:
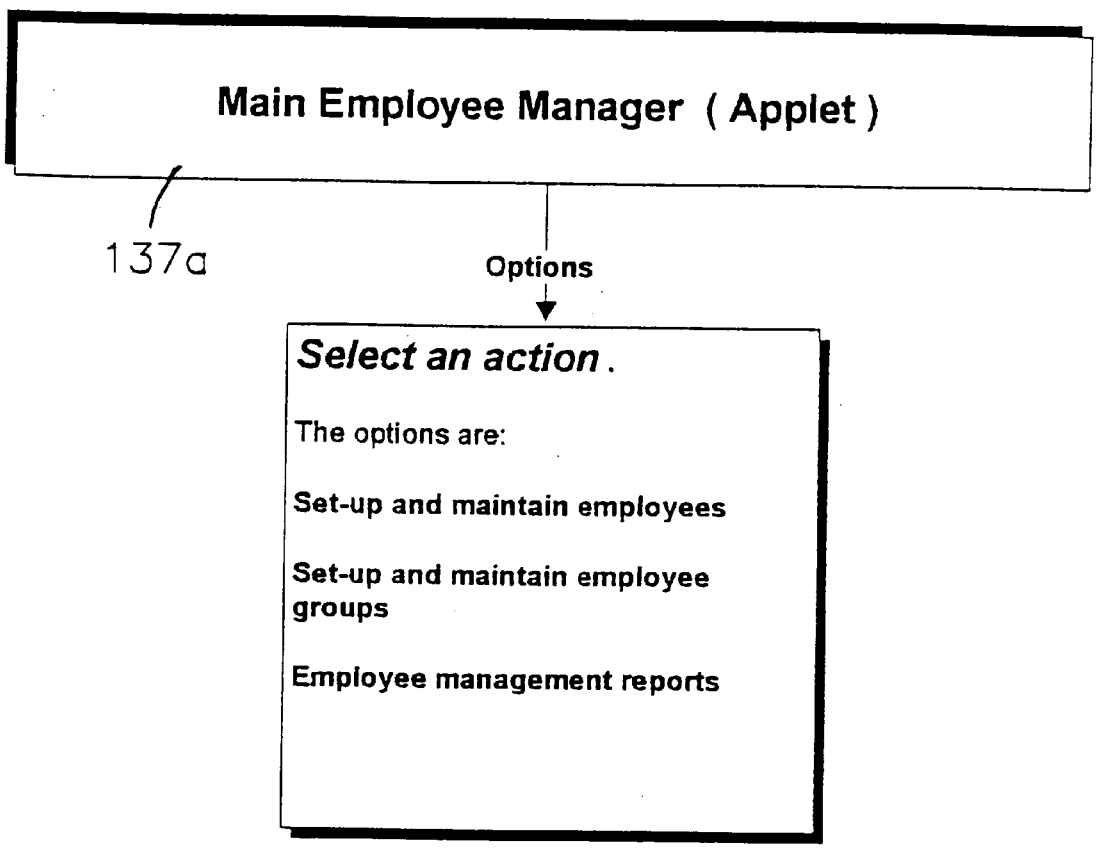
FIG. 17 is a flow chart representing the options/steps permitted by the customer server to a user at the buyer location after a decision has been made to access the "Employee:" module shown in FIG. 13 to use the "Main Employee Manager"
Figure 18:
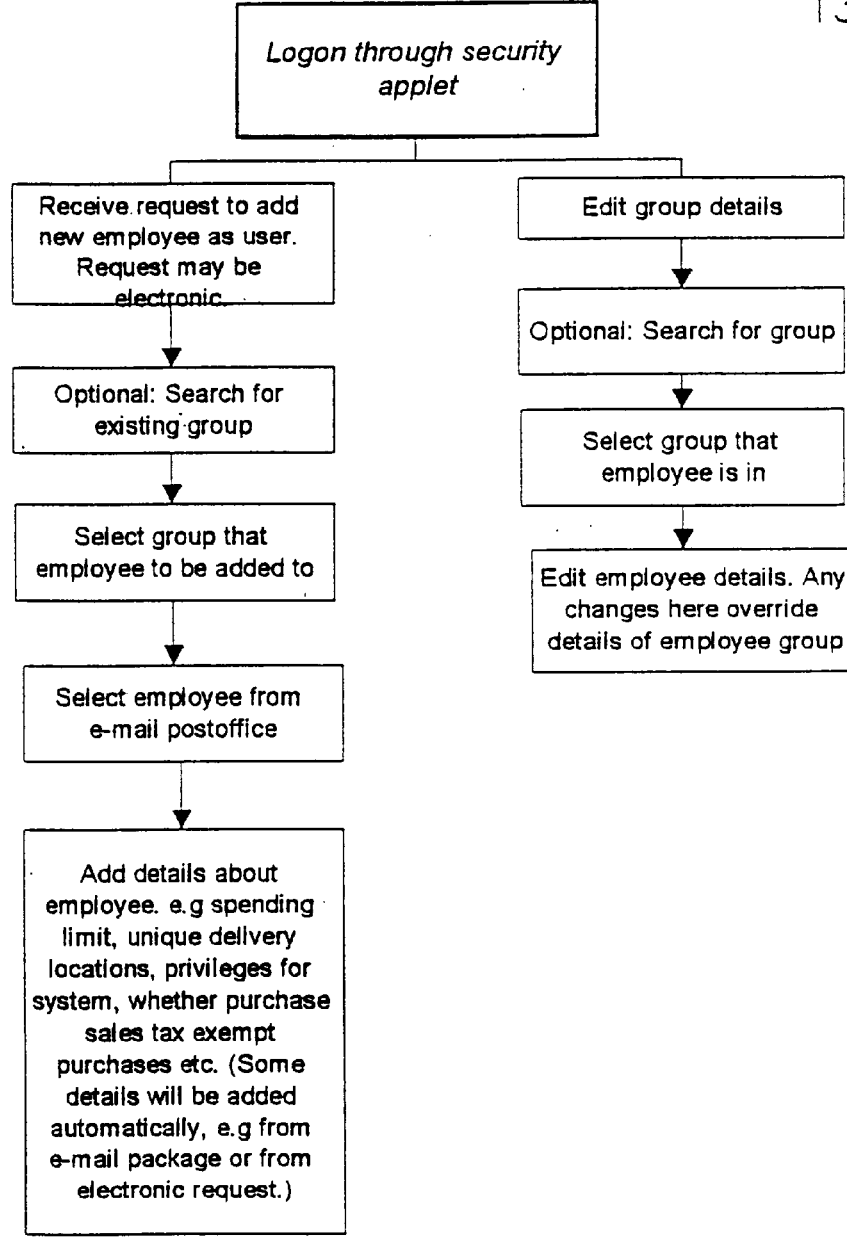
FIG. 18 is a flow chart representing the options/steps permitted by the customer server to a user at the buyer location to create and maintain employee information files or profiles.

In FIG. 15 and administrator's options for setting up and maintaining supplier groups (139b) after selecting this option from FIG. 14. In addition to establishing a set of supplies (FIG. 15), an administrator also has the option of limiting access to certain employees or groups of employees from accessing certain supplies. This is illustrated in FIG. 16, in which suppliers employees can purchase can be specified, at 139c, and this option is, again, accessed by selecting the "Supplier Management" option in FIG. 13.

Figure 19:
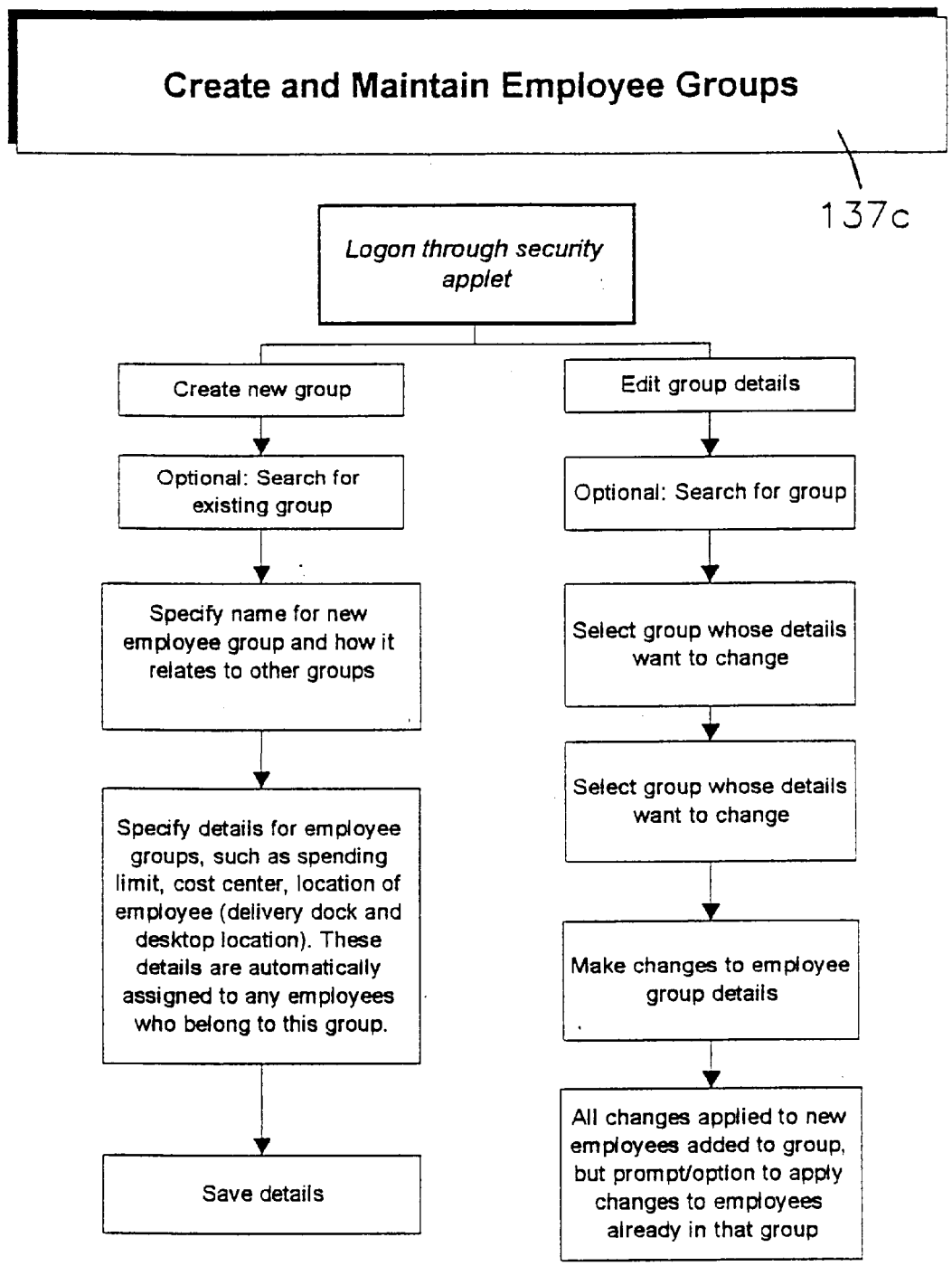
FIG. 19 is a flow chart representing the options/steps permitted by the customer server to a user at the buyer location to create and maintain employee groups.
Figure 20:
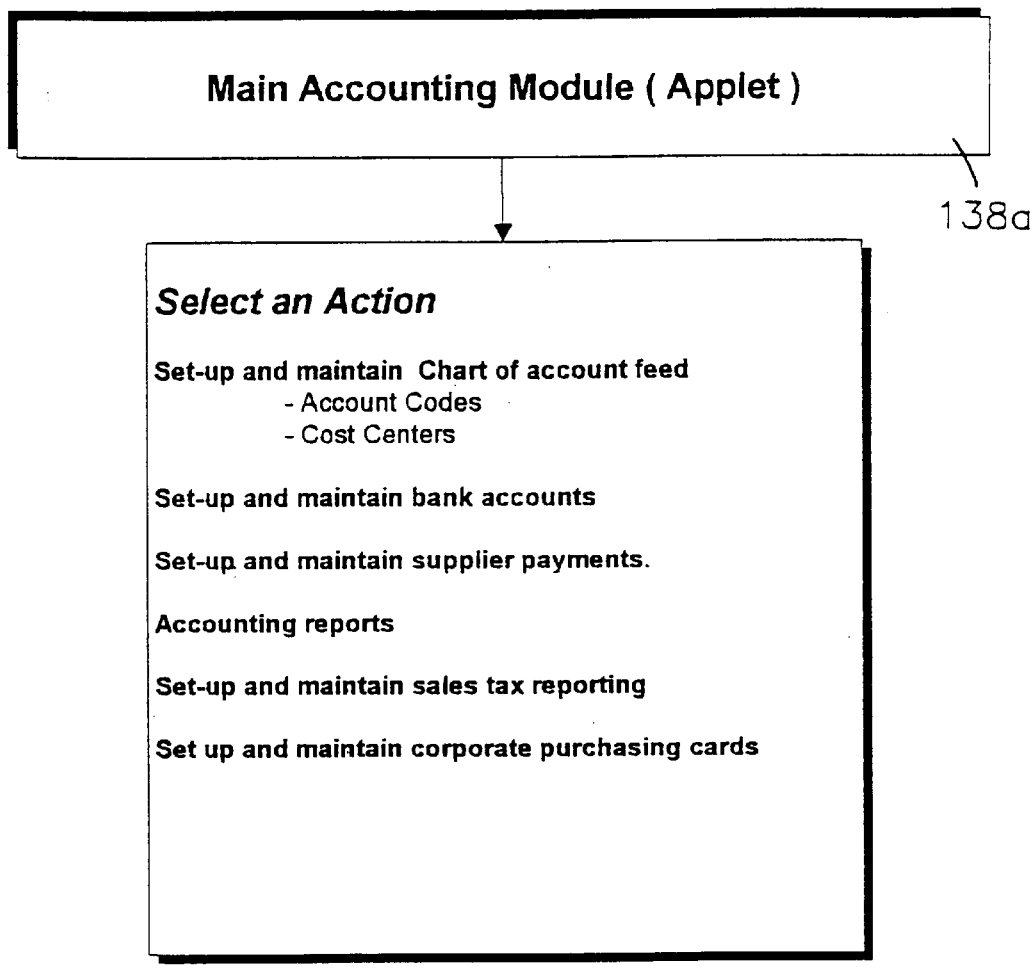
FIG. 20 is a flow chart representing the options/steps permitted by the customer server to a user at the buyer location after a decision has been made to access the "Authority Setup" option on the Administration Main Menu in FIG. 13.
Figure 21:
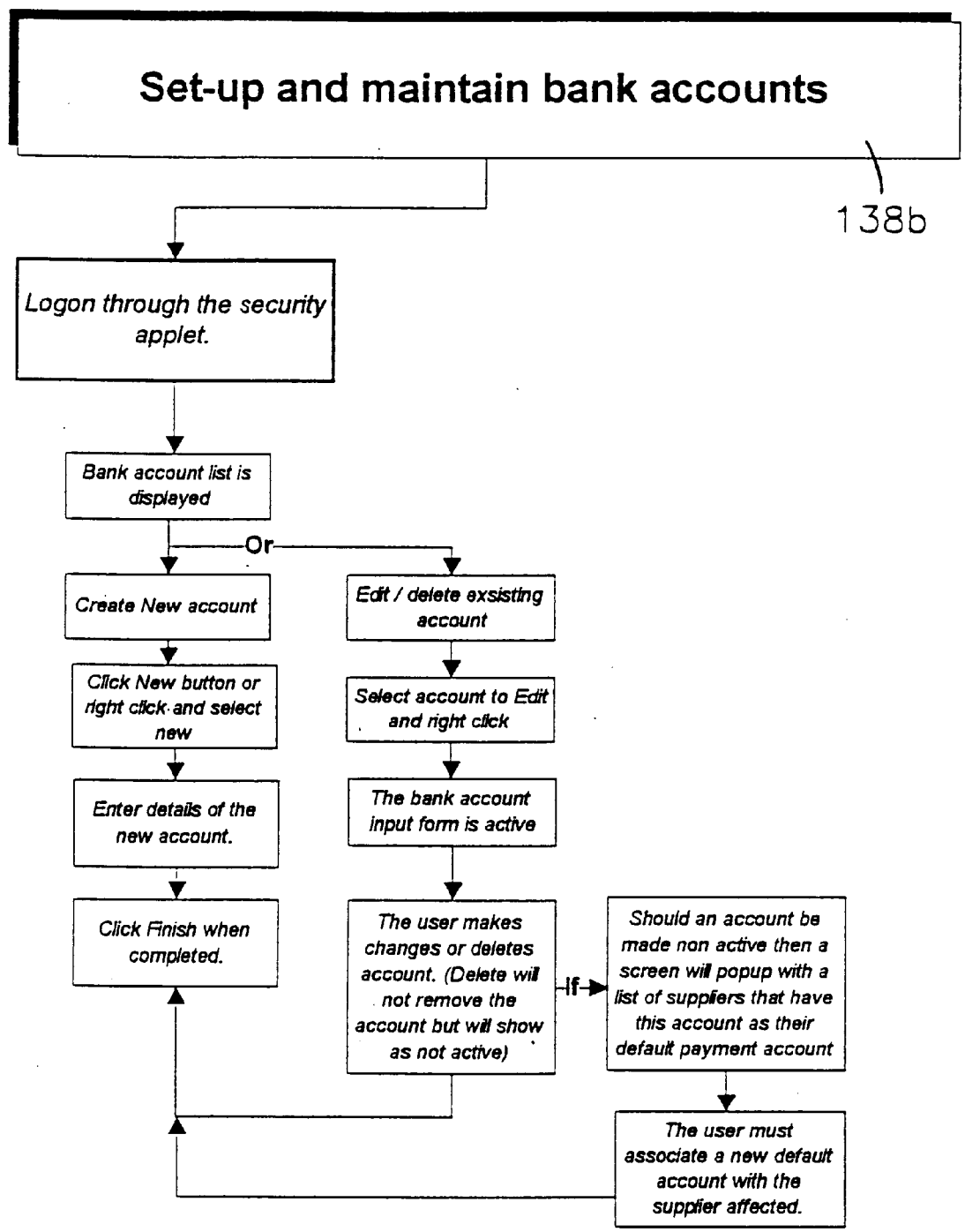
FIG. 21 is a flow chart representing the options/steps permitted by the customer server to a user at the buyer location after a decision has been made to set-up and maintain bank accounts from the main accounting module in FIG. 20.

Employee management functions 137a (FIG. 17) can be elected from the "Employee" option 137 in FIG. 13. These can be used to set up and maintain employees (137b) (FIG. 18) or create and maintain employee groups (137c) (FIG. 19).

Figure 22:
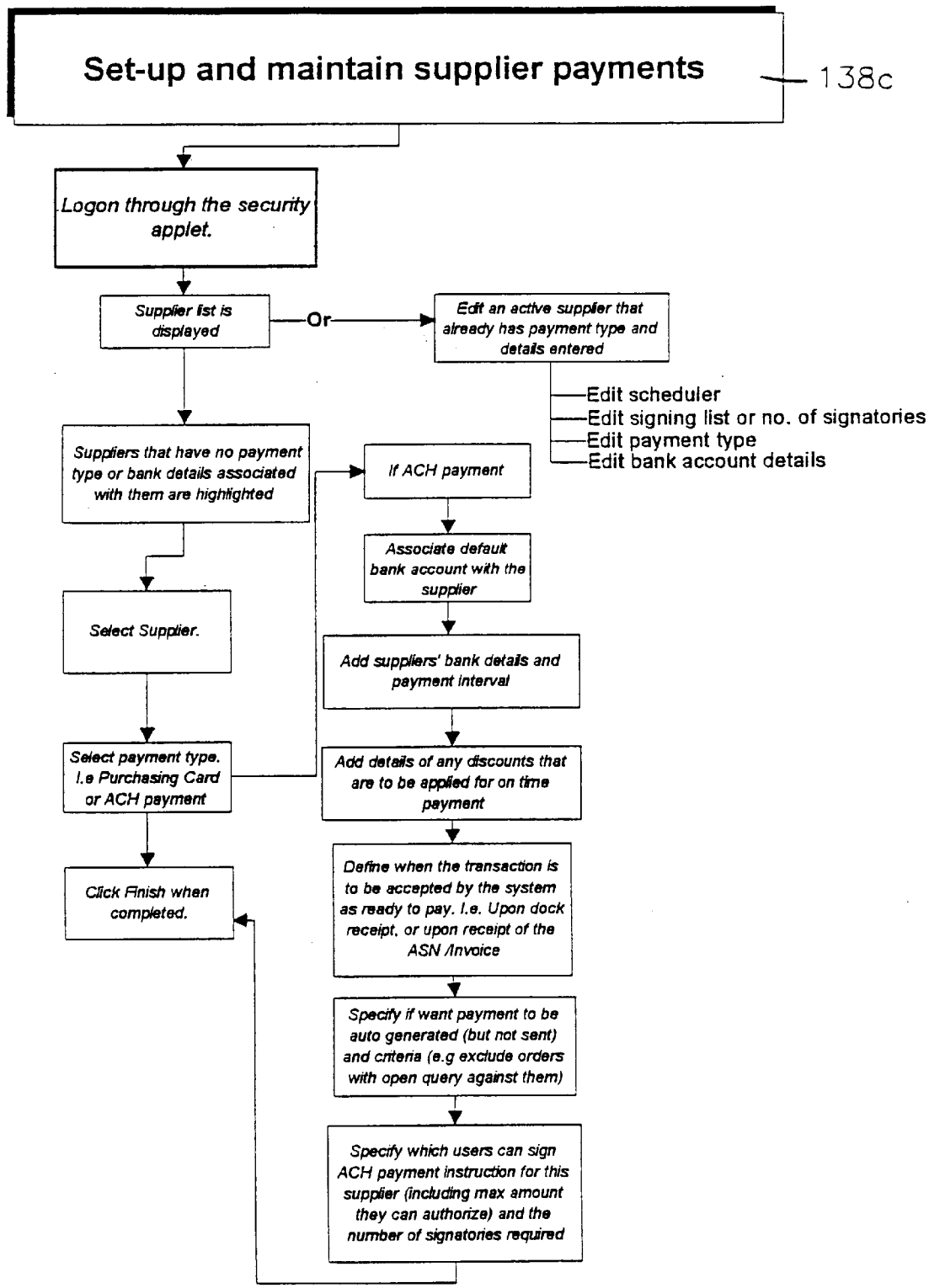
FIG. 22 is a flow chart representing the options/steps permitted by the customer server to a user at the buyer location after a decision has been made to set up and maintain supplier payments from the main accounting module in FIG. 20.

Numerous accounting options (138a) (FIG. 20) are available to an administrator by electing the "Accounting Setup" module 138 in FIG. 13. These include setting up and maintain bank accounts 138b (FIG. 21), as well as setting up and maintaining supplier payments 138c (FIG. 22). Thus, for example, the administrator can, here, select the mode of payment for goods/services ordered, i.e., purchasing card or ACH payment. Other pre-arranged options can, clearly, also be included.

The payment module procedure 141 flowchart is shown in FIG. 23, and becomes accessible by electing the "Payments" option in FIG. 13. In the example, the payments can be entered on the "payment log" of the supplier. After the payment decision has been made encrypted payment instructions are sent to the ACH gateway 50. After confirmation of payment has been received from the gateway 50 the transaction is posted to the buyer's legacy system 46.

Figure 24:
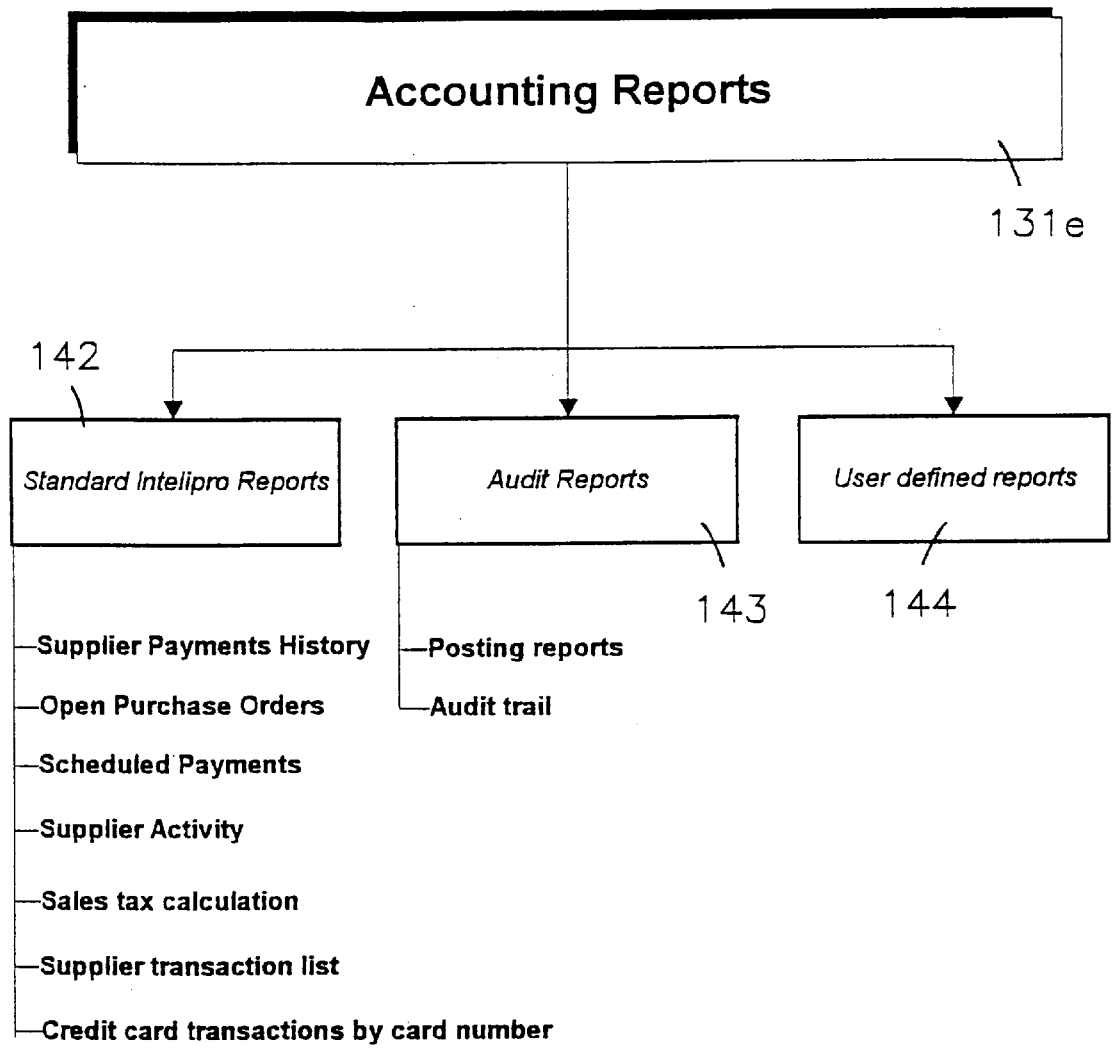
FIG. 24 is a flow chart representing the options/steps permitted by the customer server to a user at the buyer location after a decision has been made to access the "Reports" module from the Administration Main Menu in FIG. 13.

Numerous accounting reports may be generated, at 131e in FIG. 24 by electing the "Reports" option in FIG. 10. The buyer has the choice to select "Standard Reports" at 142, to audit existing reports at 143 or access "user-defined reports" at 144, which the user can define in a format that is useful to the user and saved for future use.

Figure 25:
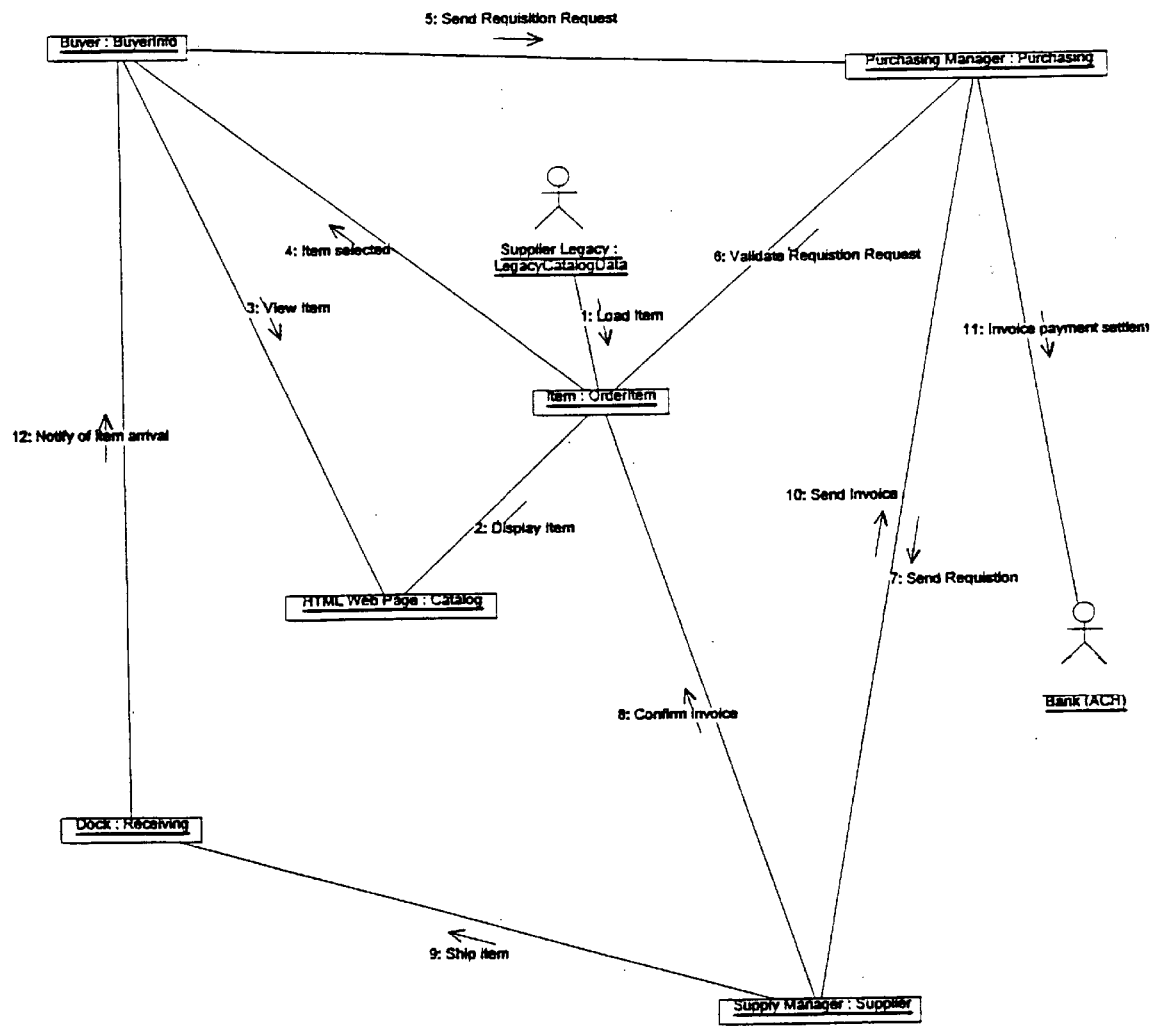
FIG. 25 is line a diagram illustrating the sequence of steps that typically take place during a purchasing transaction.

FIG. 25 illustrates the business flow steps in executing a purchase using the system. Following, normal log-on, the following steps can typically occur:

1. An item (product or service) is loaded from Supplier's Legacy Catalog 44' to the SQL Supplier Catalog Server 98 to make the item viewable to a customer user.
2. The item is displayed on HTML Web Page of Supplier's Catalog.
3. The item is viewed by user on Web Page of Supplier's Catalog by means of HTML.
4. The item is selected by user.
5. User sends requisition request to purchasing manager module in the customer server 34. This step is automatically effected when the item selected by the user exceeds the authority or purchasing parameters of the user as defined by the user's profile established by a customer administrator or manager.
6. Manager validates the requisition request.
7. Requisition is transmitted to the Supplier.
8. The Supplier confirms the requisition request to the user.
9. Item is shipped by the Supplier to the receiving dock at the customer's premises.
10. The supplier sends invoice to the Customer.
11. Invoice and payment settlement request is forwarded to the Bank (ACH) Server.
12. The Dock personnel that has received the item ordered by the user notify the user of it's arrival, so that the item may be delivered.

The procurement system of the invention, therefore, is a suite of software that provides a total solution to the problem currently associated with the procurement of non-production goods.

From the buyer's prospective, the benefits of the system is that it offers a total solution for the purchasing and payment processes, the system can provide the following benefits:

1) Substantial cost savings by eliminating the manual processing of paperwork, such as requisitions, purchase orders and invoices, and increasing control on the goods employees can purchase and the suppliers from which they purchase.
2) Increased employee satisfaction—it enables purchasing professionals to focus on their 'core' activities, such as long-term supplier contract negotiations and capital purchases, and enables requisitioners to order goods quickly and track the status of their orders at all times.
3) Enhanced MIS to track all aspects of the purchasing process, including purchasing volume, purchasing patterns by department or employee, supplier performance and sales and use tax reporting.

From the supplier's perspective the benefits of the system is that by streamlining and automating the purchasing and payment processes, the system can provide the following benefits:

1) Substantial cost savings by reducing administration involved in processing phone or paper orders; and eliminating the need for paper-based catalogs or price lists to keep customers up-to-date.
2) Improve cash flow due to prompt electronic payment.
3) Fewer orders and payment queries because of automated, integrated processes.
4) More time to spend developing customer relationships because of reduced administration and fewer queries.
5) Increased customer service because of improved turn-around on orders.
6) More orders from contract customers because they can restrict their employees from non-preferred suppliers.
7) Closer relationships with current (and future) customers through electronic catalogs customized to the exact requirements of customers.

Security is an inherent part of all software modules used to ensure that every aspect of the purchasing payment processes is secure.

On a general level, all software contain the following security features:

1) A certification authority which uniquely authenticates buyers and suppliers.
2) Public/private key technology to provide encryption/decryption, authentication, integrity and non-repudiation of all messages.
3) Encryption of all documents using strong 128-bit encryption.

4) Secure synchronous socket connections to exchange documents, reducing the risk of exceptions. The system also provides support for the EDI Transaction Receipt Acknowledgement to track the secure receipt of documents.

Purchasing also contains security and administrative control features specifically designed to meet the needs of companies purchasing electronically. For example:

5) Only authorized requisitioners can log on to the system, using username and password technology.

6) Once logged on to the system, the administrative controls set up by Purchasing Managers determine the suppliers employees can purchase from; the goods employees can purchase; and the functions employees can perform within the system.

The Transaction Gateway and Catalog Manager programs also contain security and control features specifically designed to meet the needs of the suppliers. For example:

1) Any customized catalog features, such as discounted prices for specific customers can be viewed only by those customers.

2) The Transaction Gateway maintains a full transaction log of all messages sent and received through the Gateway.

The system provides a total solution because it enables all parties involved in the procurement process to work together electronically through all phases of this process. Thus, for example, requisitioners can complete requisitions quickly and accurately by selecting goods from electronic catalogs or by using requisition templates that have been defined for them by purchasing managers. Requisitions can contain items from one or more suppliers. The customer server 34 automatically checks requisitions against the spending limit defined for each employee. If the requisition is within this limit, customer server automatically approves the requisition, then creates and sends an EDI formatted purchase order to each supplier included in the requisition. If the exceeds the spending limit, the customer server automatically forwards it to an authorized employee for approval.

All purchasing documents, such as purchase orders and invoices, are exchanged electronically (via secure synchronous connections) in Electronic Data Interchange (EDI) format over the Internet. Documents are also encrypted to ensure security. The documents to be exchanged, for example invoices, advance shipping notices and order acknowledgements (used to agree to any changes to an order), are agreed to between buyers and suppliers to ensure that companies receive documents appropriate to their specific purchasing or order processes.

Suppliers may receive and send the customer server documents using a Transaction Gateway. Suppliers can integrate the Transaction Gateway with their existing order processing systems.

The customer server provides support for both desktop delivery where requisitioners receive goods directly) and for warehouse and dock deliveries with a goods inward component to check goods in, raise queries about deliveries and route the goods to the appropriate requisitioner. The customer server links to the bank's existing systems to enable secure electronic payment for goods using a corporate purchasing card or using the bank's Automated Clearing House (ACH). If required, companies can also pay using their existing accounts payable systems.

We claim:

1. Electronic Commerce System for procuring goods/services by a plurality of users within a custom organization, comprising (a) a plurality of terminals;

(b) a customer server connectable to each of said terminals and including log-on means for providing access to said customer server to a user by means of one of said terminals only if the user can be properly authenticated for a predetermined level of purchasing authorization;

(c) a supplier system including a supplier catalog server for storing data representing a supplier catalog of goods/services that are available for purchase by authorized users in the customer organization, and a supplier processor server for processing orders received by the authorized user within the customer organization, said supplier system being directly accessible to said customer server through an internet connection; and (d) security means provided within said servers which limit transactions to customers and suppliers who have pre-arranged relationship for displaying selected supplier catalog information to a user within said organization, consistent with said predetermined level of authorization, for issuing a purchase order by the user to said supplier system, and issuing an invoice by said supplier system to the customer organization after goods/services have been delivered to the user.

2. System as defined in claim 1, wherein said terminals are connectable to said customer server by means of a LAN network.

3. System as defined in claim 1, wherein said terminals are connectable to said customer server by means of an Intranet connection.

4. System as defined in claim 1, wherein said customer server includes means for defining the level of authorization for the approval of acquisition of goods/services by a user logged on to said customer server, said level of authorization also defining pre-selected goods/services that the user has available for viewing from said supplier catalog.

5. Suppler System as defined in claim 1, wherein said customer server is provided with means for linking said customer server with a purchaser legacy system.

6. Supplier System as defined in claim 1, wherein said customer server output data format and bank server input data format are compatible and said customer and bank servers are directly coupled to each other over an Internet connection.

7. Supplier System as defined in claim 1, wherein said customer server output data format and bank server input data format are incompatible, and further comprising a clearing house gateway between said customer and bank servers for translating said output data format to be compatible with said input data format.

8. System as defined in claim 1, wherein said supplier system includes a supplier legacy catalog, said merchant catalog server including means for accessing said supplier legacy catalog to make same accessible for viewing by said users in said customer organization.

9. System as defined in claim 1, wherein said supplier system includes a supply legacy system, said supplier processor server including means for accessing said supply legacy system.

10. System as defined in claim 1, further comprising counting means at a service bureau for counting the number of purchase orders issued by said customer server to said suppler system, whereby said service bureau may be compensated for hardware, software and/or services in the use of the system.

11. System as defined in claim 1, wherein said customer server, supplier system and bank server, supplier system and bank server Internet connections use at least one of the following electronic exchange protocols: EDI (ANSI and EDIFACT), OBI (open buying on the Internet), S/MIME, MIME, SMTP, HTTP, and TCP/IP.

12. Electronic Commerce System as defined in claim 1, wherein further comprising a bank server accessible by said customer server through an Internet connection for payment to said supplier for the procure goods/services upon receiving instructions to make payment by said customer server.

13. Systems as defined in claim 1, further comprising a certificate authority for uniquely authenticating customer and suppliers to each other, whereby secure connections to exchange information and documents.

14. System as defined in claim 13, wherein said certificate authority comprises means for generating public/private keys unique to each buyer and supplier to enable encryption/decryption, authentication and integrity of all communications and/or messages transmitted between said customer server and said supplier system.

15. Electronic Commerce System for procuring goods/services by a plurality of users within an organization, comprising user hierarchy-based communication system for
   (a) a supplier computer system including a supplier catalog and an order processor, said supplier catalog containing information regarding all of said supplier's goods/services and a specific profile for the purchasing organization;
   (b) a procurement computer system including a plurality of terminals for use by a plurality of users within a purchasing organization each assigned an organization user profile which specifies a level of authorization for approval of the acquisition of goods and/or services from at least one predetermined supplier of goods, said procurement computer including means for displaying pre-selected goods/services on a terminal available for acquisition from said at least one supplier consistent with the user's level of authorization for the acquisition of goods/services from said supplier;
   (c) a communication link for selectively accessing, for downloading by a user, selected information from said supplier catalog to the user's terminal to said procurement computer and the supplier system being programmed to establish a cryptographically secure session for ordering and filling an order of goods/services, by means of said order processor, from said supplier, only when an authorized user seeks to acquire one or more products/services which the user is authorized to purchase.

16. Method of procuring goods/services by any one of a plurality of users within a customer organization from a supplier, comprising the steps of:
   (a) logging on by a user on a terminal to a customer server at the customer organization;
   (b) authenticating the user as a valid user;
   (c) connecting the user to a supplier catalog over the Internet and displaying selected goods/services on the user terminal consistent with the user's authorization profile established by the customer authorization;
   (d) completing a requisition request by the user selecting the products/services the user wants to purchase;
   (e) sending the requisition requests to the customer server and checking the request against the user's purchasing authorization limits; and
   (f) creating a purchase order for the supplies only if the user's purchasing authorization limits are not exceeded.

17. Method as defined in claim 16, wherein the user is connected to the customer server by means of an Intranet connection.

18. Method as defined in claim 16, further comprising the step of sending a message to the user's designated supervisor to approve, alter or cancel the requisition request where the user's purchasing authorization limits have been exceeded.

19. Method as defined in claim 16, further comprising the step of translating purchase orders into ANSI EDI formats prior to sending them to a supplier.

20. Method as defined in claim 16, further comprising the step of creating an electronic invoice by the supplier for the user.

21. Method as defined in claim 16, further comprising the step of establishing requisition templates that can be used by one or more users to speed up and simplify the requisition process.

22. Method as defined in claim 16, further comprising the step of paying the supplier directly from a bank by using the bank's automated clearing house (ACH) payment service when the bank is instructed to make such payment by the customer organization.

23. Method as defined in claim 16, further comprising the step of counting the number of purchase orders sent by the customer organization to the supplier to establish a service fee payable to the customer organization for the use of the system.

24. Method as defined in claim 16, further comprising the step of encrypting purchase orders prior to sending them to a supplier.

25. Method as defined in claim 24, further comprising the step of initiating a secure synchronous connection to each supplier's transaction gateway.

* * * * *